United States Patent [19]

Karplus et al.

[11] Patent Number: 4,808,314

[45] Date of Patent: Feb. 28, 1989

[54] METHOD FOR REDUCING BACTERIAL ENDOTOXIN CONTAMINATION IN SOLUTIONS OF MACROMOLECULES

[75] Inventors: Thomas E. Karplus, Sydney, Australia; Richard J. Ulevitch, Del Mar; Curtis B. Wilson, San Diego, both of Calif.

[73] Assignee: Scripps Clinic and Research Foundation, La Jolla, Calif.

[21] Appl. No.: 98,299

[22] Filed: Sep. 18, 1987

[51] Int. Cl.$^4$ .............................................. B01D 13/00
[52] U.S. Cl. ................................. 210/638; 210/639; 210/647; 210/649
[58] Field of Search ............... 210/634, 638, 639, 644, 210/645, 646, 647, 649–654; 530/324, 351, 350, 380, 381, 385, 386, 412; 436/543

[56] References Cited

U.S. PATENT DOCUMENTS

| | | | |
|---|---|---|---|
| 4,314,997 | 2/1982 | Shanbrom | 424/101 |
| 4,315,919 | 2/1982 | Shanbrom | 424/101 |
| 4,380,511 | 4/1983 | Mannuzza | 530/324 |
| 4,412,985 | 11/1983 | Shanbrom | 424/78 |
| 4,434,237 | 2/1984 | Dinarello | 436/543 |
| 4,541,952 | 9/1985 | Hosoi et al. | 530/351 |
| 4,677,194 | 6/1987 | Hao | 530/350 |

*Primary Examiner*—Frank Sever
*Attorney, Agent, or Firm*—Dressler, Goldsmith, Shore, Sutker & Milnamow, Ltd.

[57] ABSTRACT

The present invention contemplates a method of reducing a bacterial endotoxin contaminant in a biologically useful macromolecule. AN aqueous medium containing an endotoxin-contaminated macromolecule is admixed with a dialyzable surfactant, and the admixture so formed is contacted with an endotoxin sorbant to form a solid-liquid phase admixture. The contacting is maintained until the endotoxin is bound to the sorbant. The surfactant is dialyzed out of the aqueous liquid phase at a time no earlier than the maintenance step. The liquid phase containing the macromolecule is separated and recovered.

27 Claims, 3 Drawing Sheets

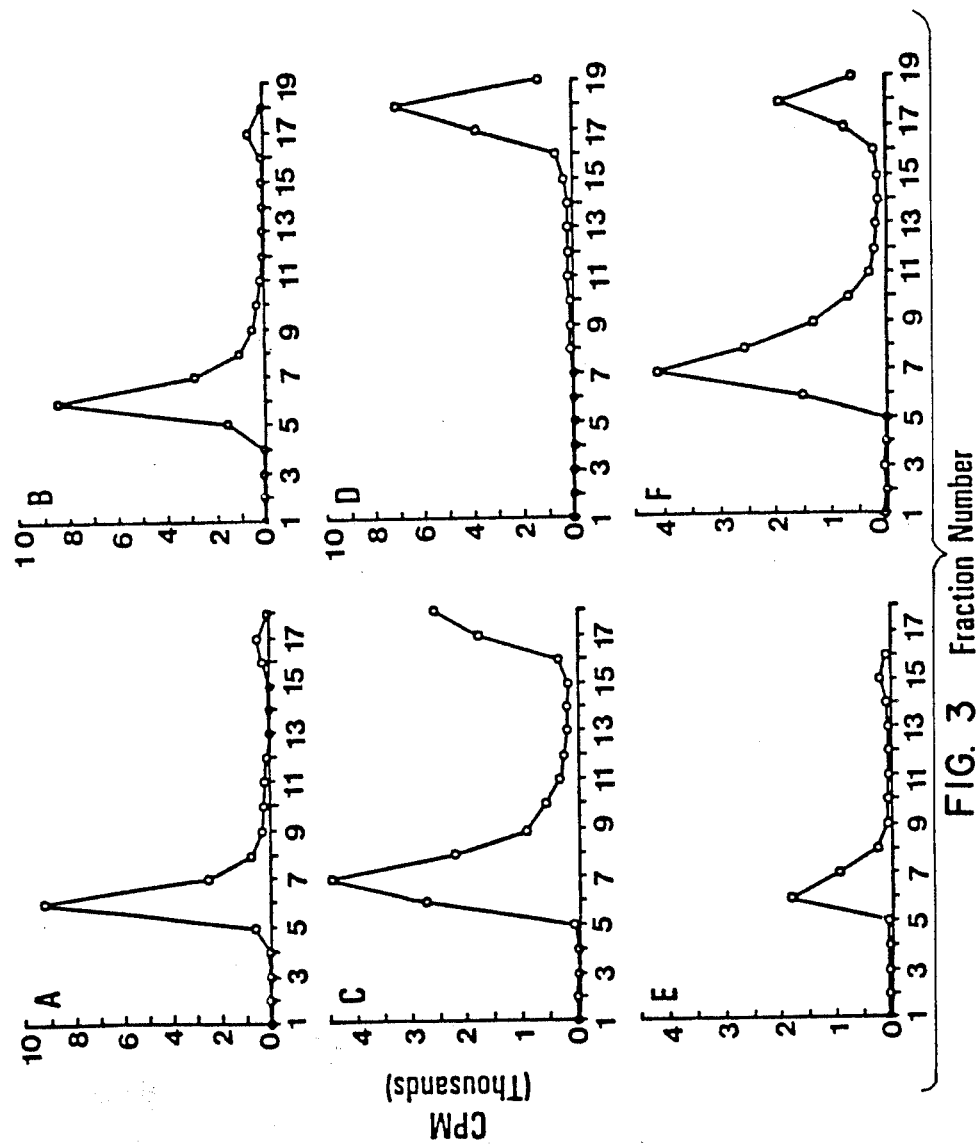

METHOD FOR REDUCING BACTERIAL ENDOTOXIN CONTAMINATION IN SOLUTIONS OF MACROMOLECULES

The present invention was made with support of the Government of the United States of America and the Government of the United States of America has certain rights in this invention.

DESCRIPTION

1. Technical Field

The present invention relates to separation methods, and in particular to a method for separating endotoxins from macromolecules.

2. Background

Bacteria are very hardy and grow in water with minimal nutrient requirements. Gram-negative bacteria can shed endotoxins from their cell walls. Endotoxins are also referred to as lipopolysaccharides (LPS). Endotoxins are therefore a potential contaminant of any aqueous solution. Further, endotoxins are extremely stable and resist extremes of temperature and pH value.

Endotoxins have a broad spectrum of biological activity. In particular, endotoxins are toxic in humans and other animals, induce fever (are pyrogenic) when present in trace amounts, and can cause hypotensive shock, disseminated intravascular coagulation and death.

Although glassware, plasticware, water, and most buffers can be effectively decontaminated from free endotoxins [see for example, Sofer, *Biotechnology*, 2:1035-1038 (1984) and Issekutz, *J. Immunol. Methods*, 61: 275-281 (1983)], many proteinaceous macromolecules such as hormones, immunoglobulins, and enzymes are biologically inactive following such treatments. This is a particularly important problem with the recent advances in biotechnology. Bacterial contamination of useful biological products is recognized as a problem [Wightsmith et al., *Prog. Clin. Biol. Res.* 43, 287 (1982)]. Enterotoxin-producing bacteria used in genetic engineering experiments can add greatly to the risk of endotoxin contamination of materials produced by such techniques.

Ultrafiltration, dialysis and many chromatography methods separate small molecules from endotoxins based on the size difference between the small molecule and endotoxin, which aggregates into high molecular weight micelles in aqueous solutions. However, endotoxins and many macromolecules are too similar in size to be separated using such techniques alone as the means of separation. In solution, the monomers of endotoxin can be bound to proteinaceous macromolecules and still exhibit endotoxin activity in biologic systems.

Chromatographic matrices with appropriate substituents have been used to adsorb endotoxins from aqueous solutions. U.S. Pat. No. 3,897,309 to Grabner discloses using basic anion exchange resins uch as diethylaminoethyl dextrans to reduce endotoxins from solutions of asparaginase. The enzyme was reportedly dissolved in salt-containing buffer (0.1 to 0.2M), and passed through a column packed with such a dextran derivative. Endotoxins reportedly adhered to the column packing thereby providing an eluate having a reduced endotoxin concentration. Endotoxin concentrations in asparaginase solutions were said to be reduced by that method, as evidenced by Limulus amoebocyte lysate (LAL) assay values of treated and untreated solutions.

U.S. Pat. No. 4,381,239 to Chibata discloses removing pyrogens as endotoxins using adsorbants comprising insoluble carriers, such as agarose, and a nitrogen-containing heterocyclic compound bonded to the carrier directly or through a spacer. Most of the exemplary solutions that were decontaminated were salt solutions or contained small molecules such as glucose or an amino acid. However, solutions of immunoglobulin, enzyme, and hormone were also treated. Pyrogen levels in treated solutions of water or saline reportedly ranged from 0 to 11 nanograms per milliliter (ng/ml), measured as endotoxin. Insulin reportedly went from 5 ng/ml endotoxin to 0.4 ng/ml, approximately a ten-fold reduction.

Morrison et al., *Immunochemistry*, 13:813-818 (1976) report that polymyxin B (PMB), a lipophilic cyclic peptide antibiotic secreted by *Bacillus polymyxa* [The United States Pharmacopeia, Twentieth Revision, 638 (1980)], binds to the lipid A moiety of endotoxin in a manner suggestive of a stoichiometric relationship of one PMB molecule to one endotoxin (LPS) monomer. PMB binding to LPS reportedly blocks mitogenic and other lipid A-dependent biological properties of LPS. Further, PMB-modified LPS (PMB-LPS) is reportedly less lethal in chick embryos, mice, rabbits and dogs.

Duff et al., Clinical Research, 30, 565A (1982) report an affinity chromatography endotoxin removal method using PMB. Briefly, polymyxin B (PMB) linked to activated Sepharose 4B was admixed with endotoxin dissolved in pyrogen-free water or saline, and the resulting admixture was agitated until equilibrium was reached. At least ninety percent of the endotoxin was reportedly retained on the PMB-coupled resin. The Duff et al. method separates solutions of pyrogen-free water or saline from added LPS. The method was not used with solutions of macromolecules and LPS. Further, the authors do not state that the procedure is suitable for removing endotoxin from solutions of macromolecules.

Issekutz, *J. Immunological Methods*, 61:275-281 (1983), reports a similar method using PMB linked to Sepharose 4B as an affinity sorbant for LPS. Issekutz also uses the sorbant to separate LPS from solutions of small molecules such as salt or serum-free tissue culture medium and additionally shows a single example in which endotoxin is separated from tissue culture medium containing 10% serum. Issekutz states that the presence of serum did not alter the effectiveness of endotoxin removal.

Issekutz also reports removal of at least 85 percent of 500 micrograms of PMB-bound endotoxin from the column by eluting with solution of 1 percent sodium deoxychloate in a 0.1 molar Tris buffer at a pH value of 8.0. The deoxycholate was separated from the eluted endotoxin by dialysis.

As described hereinafter, solutions that contained the enzyme catalase contaminated with endotoxin were treated by affinity chromatography with PMB-linked Sepharose 4B following the Issekutz procedure. The resulting catalase-containing solution contained approximately one-half of the protein of the original solution and about 7 to 12 percent of the original endotoxin. The remaining approximately ten percent of the endotoxin was closely associated with the enzyme and remained associated with the enzyme through subsequent PMB-Sepharose 4B treatments. It is therefore believed that the less efficient endotoxin removal from a protein-containing solution is due to endotoxin that is complexed with the protein in the serum.

U.S. Pat. No. 4,276,050 to Firca et al. discloses a method of detecting endotoxins in body fluids such as blood, plasma and serum. According to that disclosure, the association of endotoxins with lipids and proteins in the body fluid "masks" endotoxin's biological activity. Further, body fluids are reportedly known to contain inhibitors to the Limulus amoebocyte lysate test used to assay for the presence of LPS.

The patent broadly discloses "unmasking" the endotoxins by treatment with salt, detergents, or organic chemical solutions, such as 2% Tween-80, 2% dextran sulfate, 3% sodium chloride, or 2% ammonium thiocyanate, and preferably benzamidine. The sole actual example of the Firca et al. patent utilizes 0.002M solutions of benzamidine or its biologically compatible acid addition salts. Those solutions are admixed with the body fluid and separated from the body fluid by affinity chromatography. "Unmasked" endotoxins adhere to the column and are eluted with strong detergent or salt solutions, such as 2% sodium dodecyl sulfate (SDS), 3% sodium deoxycholate, or 2M MgCl. Eluted endotoxins are precipitated with alcohol and detected by known methods.

Although that technique reportedly separates endotoxins from protein and lipid in body fluid to give purified endotoxins, it does not disclose separating of protein and lipids from endotoxin to provide purified proteins and lipids that are sufficiently free of endotoxins for parenteral use in an animal. For example, if 90 percent of the endotoxins were reduced and concentrated on the column, as described above for the similar technique reported by Duff, the Firca et al. method would produce sufficiently purified endotoxin to facilitate quantitation.

However, that procedure would still permit about 10 percent of the originally present endotoxin to remain associated with protein to be eluted from the column. The presence of that 10 percent protein-associated endotoxin may not affect the endotoxin assay. Nevertheless, the endotoxin-contaminated protein could remain pyrogenic. Thus, although the Firca et al. method is useful for the purification of endotoxin, it does not disclose the purification of protein or other macromolecules to the point of being sufficiently free of endotoxin to be used parenterally as assayed by the Limulus or other determination.

It would be useful to have a method for separation of endotoxins from biologically useful macromolecules that would reduce enough endotoxin to produce a macromolecule that passed the United States Pharmacopeia rabbit pyrogen test. [*The Pharmacopeia of the United States of America*, Seventeenth Revision, 863 (1965)]. It would be advantageous if that method did not substantially impair the macromolecule's biological activity and did not result in a product having other added substances that could be harmful upon parenteral administration.

SUMMARY OF THE INVENTION

The present invention contemplates a method for reducing the bacterial endotoxin concentration in a solution containing a biologically useful macromolecule comprising the following steps: (a) admixing a dialyzable surfactant with a biologically useful macromolecule that contains a contaminating amount of endotoxin in an aqueous medium to form an aqueous admixture. The surfactant so utilized has a critical micelle concentration (cmc) of at least about 0.2 weight percent or at least about 5 millimolar, and preferably at least about 0.5 weight percent or at least about 8 millimolar, is non-pyrogenic, is physiologically tolerable, is non-denaturing, and exhibits no net electric charge at the pH value of the aqueous admixture. The surfactant is used at a concentration greater than that of its cmc. (b) That aqueous admixture is contacted with a solid phase water-insoluble endotoxin sorbant containing an endotoxin sorbing agent such as polymyxin B linked to a solid matrix, which can be monolithic or particulate, to form a solid-liquid phase admixture. (c) The contact of the solid-liquid phase admixture is maintained, preferably substantially continually as by agitation or flow, for a predetermined time period sufficient for the endotoxin to bind to the solid phase sorbant and thereby form a second solid-liquid phase admixture whose liquid phase contains water, the macromolecule, and a reduced endotoxin to macromolecule weight ratio as compared to that ratio that was present in the first solid-liquid phase admixture. The second solid-liquid phase admixture can also contain surfactant. (d) The solid and liquid phases of the second solid-liquid phase admixture are separated. (e) The surfactant is dialyzed from the liquid phase at a time no earlier than step (c); i.e., either (i) during the maintenance step, or (ii) after the separation of solid and liquid phases, to provide a liquid phase that is substantially free of surfactant. And (f), thereafter recovering the surfactant-free liquid phase that contains the macromolecule and contains a reduced concentration of contaminating endotoxin at a macromolecule concentration utilized for in vivo administration.

In one embodiment, the surfactant is present in the second liquid admixture, and is dialyzed out of the solution in step (e); i.e., after separation of the solid and liquid phases. In another embodiment, the surfactant is dialyzed from the composition during the contacting and maintaining steps.

The decontaminated macromolecule produced by a method of this invention is particularly useful for in vivo parenteral administration to animals such as laboratory animals like mice, rats and rabbits, veterinary animals like horses, cow, dogs and sheep, and to humans.

A benefit of the invention is that solutions of biologically useful macromolecules contaminated with endotoxins can be decontaminated by the method of this invention so that the solutions pass the USP Rabbit Pyrogen Test at a macromolecule concentration designed to be introduced into such an animal.

Another benefit is that macromolecules purified by the method of the invention remain biologically active.

A further benefit of the invention is that a macromolecule can be utilized in vitro or in vivo free from the effects of endotoxin in the system.

The method provides an advantage in that it is simple, practical and suitable for treating large volumes of material in a commercial setting.

Other benefits and advantages will be apparent to those skilled in the art from the detailed description that follows.

The animals of panel were injected with untreated catalase, those of panel G were injected with saline as one control, whereas those of panel H were injected with a solution that contained 1 microgram (ug) of endotoxin from Salmonella minnesota Re595 as a second control. The animals were injected with catalase that was treated as follows for the other panels: panel B=polymyxin B linked to Sepharose 4B (PB-Seph 4B); panel C=unlinked polymixin B (PB) and octylglucopyranoside (OBDG); panel D=PB alone; panel E=OBDG alone; and panel F=PB-Seph 4B plus OBDG. The data show that only the catalase given the complete treatment (panel F) satisfied the criteria for nonpyrogenicity.

Figure 2:
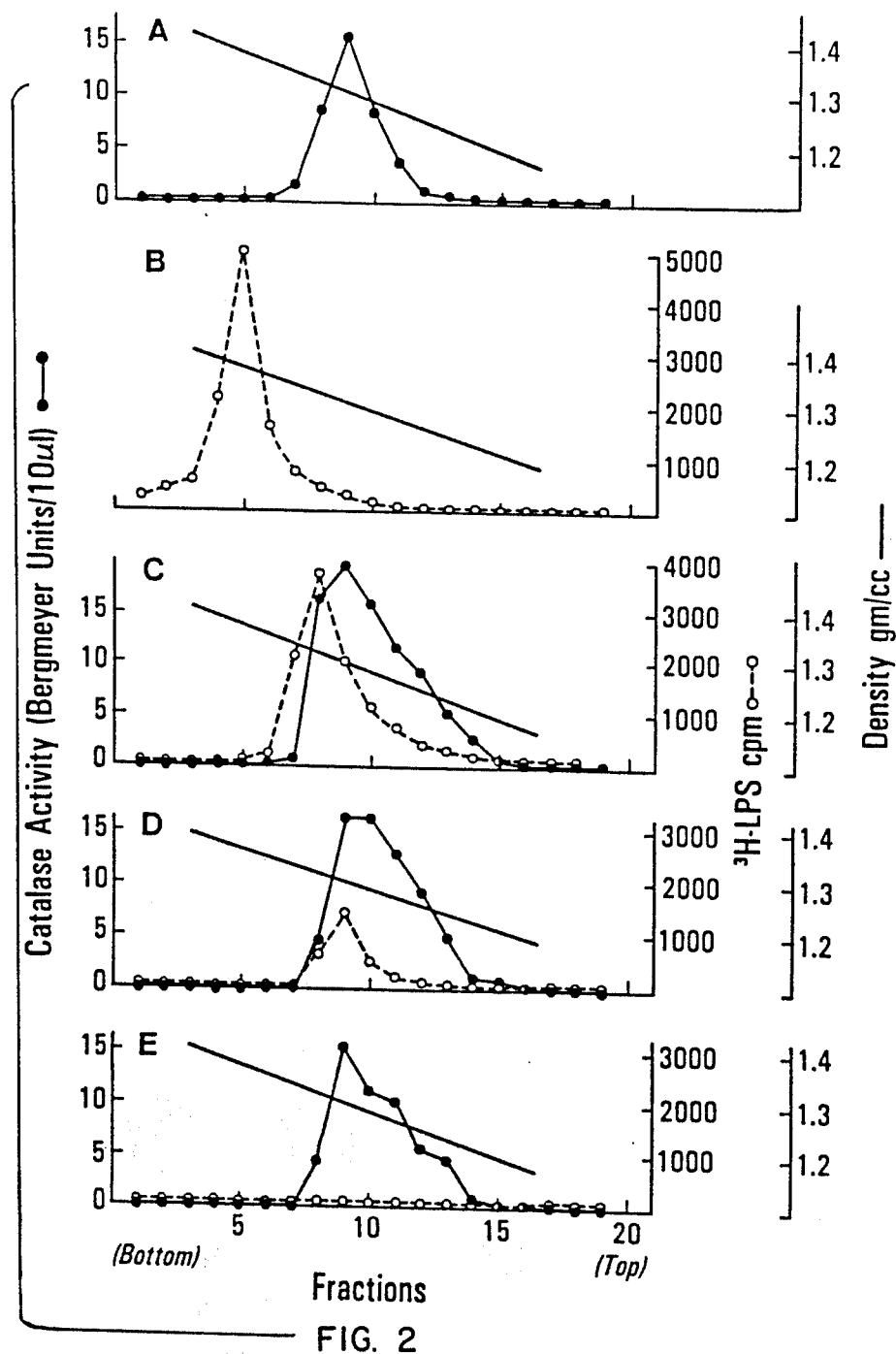

FIG. 2 contains five graph Panels (A-E) that illustrate CsCl gradient patterns for compositions of catalase alone (solid line and ●; Panel A); $^3$H-LPS alone (dotted line and O Panel B) and mixtures thereof. When catalase and $^3$H-LPS were admixed and maintained, a shift of the $^3$H-LPS to the region of catalase was observed (Panel C), indicating binding to the protein of the endotoxin. PB-Seph 4B treatment of the admixture (Panel D) produced a reduction of $^3$H-LPS, but LPS clearly remained associated with the protein peak. Panel E illustrates that treatment with PB-Seph 4B plus OBDG resulted in complete removal of $^3$H-LPS, indicating OBDG's ability to dissociate protein-bound $^3$H-LPS.

Catalase activity (●) in Bergmeyer units per 10 microliters (Units/10 ul) is shown on appropriate left ordinates. LPS activity (O) in counts per minute (cpm) is shown on the inner-most right ordinate. The density in grams per cubic centimeter (gm/cc) is shown by the solid line and outer-most right ordinate. The gradient fractions from bottom to top and left to right are shown on the abscissa.

FIG. 3 contains six graph panels (A-F) that illustrate CsCl ultracentifugation patterns of $^3$H-Re595 LPS ($^3$H-LPS) treated or untreated with OBDG prior to admixture and maintenance (incubation) with normal rabbit serum (NRS). Panel A shows the gradient pattern observed when the $^3$H-LPS was incubated with NRS without OBDG treatment. Panel B shows the gradient pattern observed when the $^3$H-LPS was treated with OBDG at a final concentration of 5 millimolar (5 mM) prior to incubation with NRS. Panel C shows the results observed when the OBDG concentration was increased to 10 mM, and illustrate a greater partial shift of the $^3$H-LPS counts to the position of high density lipoprotein (HDL). Panel D shows the result obtained when the OBDG concentration was further increased to 20 mM, and illustrate a complete shift of the $^3$H-LPS counts to the HDL position. Treatment of $^3$H-LPS with 20 mM OBDG followed by subsequent incubation in saline, but in the absence of NRS, showed no shift in the position of the counts peak (Panel E). Panel F shows the result obtained when the NRS was treated with 10 mM of OBDG prior to incubation with the $^3$H-LPS, and illustrates an effect indistinguishable from that seen in Panel C that utilized a pretreatment of the $^3$H-LPS with the same final concentration of OBDG.

DETAILED DESCRIPTION OF THE INVENTION

A. Method For Reducing Endotoxin

The present invention contemplates a practical, effective method for reducing the amount of contaminating bacterial endotoxin in a solution containing a biologically useful macromolecule, particularly a proteinaceous macromolecule such as an enzyme, an immunoglobulin, or the like, without substantially impairing the biological activity of the macromolecule. In preferred practice, the method provides a substantially endotoxin-free macromolecule at the particular macromolecule concentration at which the macromolecule is used for in vivo administration, as for parental administration to an animal.

The method broadly includes the steps of: (a) admixing a biologically useful macromolecule that contains a contaminating amount of endotoxin with a dialyzable surfactant in an aqueous medium to form an aqueous, liquid admixture, the surfactant utilized having a critical micelle concentration (cmc) of at least about 0.2 weight percent or at least about 5 millimolar and is present as a dispersion in the aqueous medium in an amount above its cmc; (b) that aqueous admixture is contacted with a solid phase water-insoluble endotoxin sorbant containing an endotoxin sorbing agent such as polymyxin B linked to a solid matrix to form a solid-liquid phase admixture; (c) the contact of the solid-liquid phase admixture is maintained (preferably substantially continually) for a predetermined period of time sufficient for the endotoxin to bind to the sorbant and thereby form a second solid-liquid phase admixture whose liquid phase contains water, the macromolecule, and a reduced endotoxin to macromolecule weight ratio relative to the same ratio in the first aqueous admixture, the second liquid admixture can also contain surfactant; a solid phase that contains the sorbant and bond endotoxin is also formed; (d) the solid and liquid phases of the second solid-liquid phase admixture are separated; (e) the surfactant is dialyzed substantially from the liquid phase at a time no earlier than the maintenance step (c); i.e., either (i) during the contact maintenance step, or (ii) after separating the solid and liquid phases; and (f) the substantially surfactant-free liquid phase is retained (recovered). In either sequence, the liquid phase ultimately produced is an aqueous solution of the macromolecule that is substantially free of the surfactant and contains a reduced amount of endotoxin at a macromolecule concentration utilized for in vivo administration.

In one embodiment of the above method, dialysis is carried out subsequent to the maintenance step, whereas in a second, more preferred embodiment, the maintenance and dialysis steps are carried out substantially simultaneously. These two embodiments and their variants are discussed below.

In a first variant of the first-mentioned embodiment, the endotoxin sorbant is particulate as in the form of small beads or a powder (when dry) and is preferably contained within a column as is used in column chromatography. The aqueous medium containing the macromolecule, its contaminating endotoxin and surfactant are loaded on to and then eluted from the sorbant-containing column in the contacting and maintaining steps. The resulting aqueous eluate that constitutes the separated liquid phase of the second solid-liquid phase admixture is thereafter dialyzed to remove the surfactant.

In a second variant, the solid sorbant is monolithic with the endotoxin sorbing agent affixed to one or more surfaces. Typically, a monolithic sorbant is in the form of one or more sheets or webs, or a surface of a tube or other vessel. Here, the contacting and maintenance steps are again carried out by passage of the aqueous medium over the sorbant-containing surface and is followed by dialysis.

In a second, more preferred embodiment, the maintenance and dialysis steps are carried out substantially simultaneously.

In a first variant of this second embodiment, the solid phase sorbant is particulate and can be the same as the before-described particulate sorbant. Here, the before-described admixture is contacted with the solid phase endotoxin sorbant in a dialysis bag whose solute molecular weight exclusion is less than that of the molecular weight of the macromolecule. The contacting between the solid phase sorbant and liquid phase is preferably maintained substantially continually as by shaking or tumbling the bag within the dialysis liquid so that the concentrations of macromolecule, endotoxin and surfactant are substantially homogeneous throughout the liquid phase at any time during the combined maintenance-dialysis step, and the endotoxin sorbant thereby can readily contact the liquid within the dialysis bag. The maintenance-dialysis step is typically terminated when the liquid phase of the formed second admixture is substantially free of surfactant. The solid and liquid phases are thereafter separated as by centrifugation to provide a separated aqueous, liquid phase that contains the macromolecule and is substantially free from surfactant as well as having a reduced amount of contaminating endotoxin at the concentration of macromolecule utilized for in vivo administration.

A second variant of this second embodiment utilizes a monolithic endotoxin sorbant that constitutes a surface of a semipermeable membrane whose solute molecular weight exclusion is less than that of the macromolecule. This variant is similar to the variant discussed immediately above except that the endotoxin sorbing agent such as polymixin B is affixed to the surface of the membrane so that flow of the first aqueous admixture across the surface of the membrane that includes the endotoxin sorbing agent provides the preferred continual contact during the time that the liquid admixture traverses the dialysis apparatus.

Thus, this variant provides a relatively simple and drect decontamination and separation. The first aqueous admixture of endotoxin-contaminated macromolecule and surfactant is fed into the dialyzer such as a hollow fiber dialyzing apparatus used in hemodialysis, the endotoxin present is sorbed onto the surface of the membrane contacted by that admixture as the liquid traverses the apparatus, the surfactant is dialyzed out of the admixture during that same traverse, and the solid and liquid phases are separated as the liquid emerges from the dialyzer, with the emerging, aqueous liquid phase containing the macromolecule and a reduced amount of the contaminating endotoxin at a macromolecule concentration utilized for in vivo administration.

Examining the above embodiments and their variants further, in the first embodiment, a biologically useful macromolecule containing a pyrogenic or contaminating amount of endotoxin is admixed with a dialyzable surfactant in an aqueous medium to form an aqueous admixture. That admixture is contacted with a particulate or monolithic solid phase endotoxin sorbant (first and second variants, respectively) that contains an endotoxin sorbing agent or agents linked or otherwise affixed to a solid matrix to form a first solid-liquid phase admixture. That contact is maintained for a predetermined time period sufficient for the endotoxin to be bound, thereby forming a second solid-liquid phase admixture. The resulting solid and liquid phases are separated, and the liquid phase containing the surfactant and macromolecule is dialyzed to remove the surfactant and provide an aqueous solution of the macromolecule.

The first variant of the second embodiment includes the steps of continually contacting a liquid admixture as described above with a particulate solid phase sorbant to form a first solid-liquid phase admixture while dialyzing the solid-liquid phase admixture so formed. The dialysis and continual contacting are maintained for a time sufficient for the endotoxin to bind to the sorbant and for the surfactant to dialyze out of the liquid to form a second solid-liquid phase admixture. The solid and liquid phases of the second admixture are separated, and the liquid phase containing the macromolecule but substantially free of surfactant is retained.

The second variant of the second embodiment includes the following steps. A liquid admixture as described before is dialyzed using a solid phase semipermeable membrane containing endotoxin sorbing agent affixed to the surface of the membrane contacted by the liquid admixture. The dialysis is continued for a period of time sufficient to bind the endotoxin as well as to remove the surfactant present in the liquid admixture (thereby forming a second solid-liquid phase admixture), and the dialyzate (separated liquid phase) is collected.

The macromolecule solution described above, prior to treatment by a method of the invention, is referred to as containing a contaminating amount of endotoxin. After use of the method, the macromolecule solution is said to be decontaminated, contain a reduced concentration of contaminating endotoxin, or a similar phrase. The presence and reduced concentrations or amounts of endotoxin are assayed at the concentration of the particular macromolecule to be utilized for in vivo administration to an animal such as a laboratory animal like a mouse, rat or monkey, a verterinary animal like a horse, cow, dog or sheep, or a human.

Regardless of the macromolecule or animal in which it is to be administered, the presence or relative freedom from (reduced concentration of) endotoxin is determined in either of two assays. The first assay is the Limulus ameobocyte lysate (LAL) assay, whereas the second is the U.S.P. rabbit pyrogen test. Both procedures are discussed hereinafter.

Thus, a solution of the macromolecule at a concentration for in vivo use in an animal that is negative for endotoxin in the LAL assay or is non-pyrogenic in the U.S.P. rabbit pyrogen test is defined to be free of contaminating endotoxin, or to contain a reduced or non-contaminating amount of endotoxin. In contrast, a macromolecule solution at the concentration of use that is positive for endotoxin in the LAL assay or is pyrogenic in the U.S.P. rabbit test is defined to be contaminated with or contain a contaminating amount of endotoxin. It is to be understood that a given macromolecule solution can contain endotoxin by the LAL assay and not be pyrogenic. Similarly, a solution can be free from endotoxin by the LAL assay and nevertheless be pyrogenic. The assay to be used therefore will depend upon the desired end use of the solution, as is known by skilled workers.

Numerous types of biologically useful macromolecules can be separated from contaminating endotoxin by the method of this invention. For example, the method can be used to decontaminate endotoxin-contaminated solutions of proteins, including enzymes such as catalase, immunoglobulins such as mouse or human IgG, hormones such as insulin, thyroglobulin, and pituitary hormones, and other proteins found in the body such as growth factors, interferons, clotting factors and the like. The invention is useful to separate contaminated solutions of cell wall proteins derived from gram negative bacteria, viral envelope proteins, and other macromolecules useful in the preparation of vaccines. The invention is also useful to separate other macromolecules that do not contain essential lipid cofactors such as nucleic acids, and the like.

The contaminated macromolecule must itself be large enough that it does not pass through a dialysis membrane. Macromolecules having molecular weights of at least about 10,000 daltons are sufficiently large that they will not dialyze out of solution with usually utilized dialysis membranes. Thus, a molecule having molecular weight of about 10,000 daltons or greater can be defined herein as a macromolecule. Dialysis membranes are available from the Amicon Corporation, for example, that have molecular weight exclusions below 10,000 daltons. Consequently, a more inclusive definition of a macromolecule is a molecule that does not dialyze from the admixture under conditions in which the surfactant will so dialyze. A macromolecule is therefore non-dialyzable whereas the surfactant is dialyzable using the standard dialysis assay that is discussed hereinafter.

In a preferred embodiment, the macromolecule is a protein present in the aqueous macromolecule-surfactant admixture prior to contacting with endotoxin sorbant at a concentration of about 200 micrograms per milliliter (ug/ml) to about 100 milligrams per milliliter (mg/ml), and more preferably from about 1 to about 50 mg/ml. As will be seen from the data presented hereinafter, relatively little of the macromolecule is lost during the purification method whereas the concentration of endotoxin decreases 100-10,000-fold. Thus, the weight ratio of endotoxin to macromoledule is reduced in the liquid phase of the second solid-liquid phase admixture as compared with the same ratio present in the original aqueous liquid admixture. That the ratio has been reduced can be readily ascertained by comparing the Limulus assay dilution required for the absence of endotoxin at a given protein concentration in the aqueous liquid admixture prior to use of this method and in the liquid phase after dialysis.

A surfactant useful in the present invention is itself non-pyrogenic, physiologically tolerable, non-denaturing and is dialyzable. The surfactant also exhibits no net electric charge at the pH value of the first aqueous admixture, and is preferably nonionic.

The word "non-pyrogenic" is used herein to mean that any residual surfactant present in the dialyzed macromolecule solution after dialysis or present in a more concentrated macromolecule solution resulting from the dialyzed macromolecule solution does not itself cause a pyrogenic response in the standard U.S.P. raobit test discussed hereinafter. Stated differently, the surfactant is non-pyrogenic at the concentrations present when the macromolecule is utilized in vivo (parenterally).

In being non-pyrogenic, the surfactant is also free from endotoxin. Freedom from endotoxin can be readily assayed in the Limulus ameobocyte lysate (LAL) assay. Again, freedom of the surfactant from the presence of endotoxin is assayed at the concentration of residual surfactant present when the macromolecule is used. An exemplary study for one surfactant is described hereinafter.

The surfactant is also generally physiologically tolerable (acceptable) in animals at a residual amount that may be present along with the macromolecule at the concentration at which the macromolecule is utilized in vivo. Pyrogenicity is one form of physiological intolerability that can be exhibited by a parenterally administered material. However, inasmuch as one purpose a method of this invention is to decontaminate a macromolecule for parenteral in vivo use, residual surfactant should also not cause additional intolerable side effects, as is the case for any parenterally administered substance. Physiological tolerability of the residual surfactant can be determined by usually utilized pharmocological assay procedures well known to skilled workers.

The non-denaturing characteristic of a useful surfactant is typically determined as a function of the ability of a surfactant to solubilize and thereafter reconstitute membrane proteins using well known techniques. Manufacturers' and suppliers' literature frequently provide information as to the denaturing characteristics of a particular surfactant, as well as the assays used for such a determination.

The term "free from net electric charge" and its equivalent phrases is used herein to mean that the surfactant is electrically neutral at the stated pH value. Thus, the surfactant can be nonionic, as is preferred, or can be zwitterionic where the positive and negative charges are balanced, but cannot be anionic as is the case of SDS or a bile acid, nor cationic as in the case of a quaternary amine-containing surfactant.

Dialyzability of a surfactant is of particular importance to the present invention, since it is through dialysis, as defined herein, that the surfactant is separated from the biologically useful macromolecule. Whereas substantially all surfactant molecules can be removed from a solution by dialysis if enough time is used, dialyzability as contemplated herein is a relatively rapid occurrence.

Typically, a surfactant having relatively a high critical micelle concentration (cmc) dialyzes out of a solution (or dispersion) more rapidly than does a surfactant having a relatively low cmc. This is thought to be due to the presence of a relatively higher concentration of monomeric surfactant present in solution for a surfactant of relatively high cmc than for a surfactant of relatively low cmc, and it is the monomeric surfactant that dialyzes through the membrane.

The cut off point between a relatively high cmc value and a relatively low cmc value for the purposes of the present invention appears to be at a concentration of at least about 5 millimolar (mM), and more preferably at least about 8 mM. That is, a surfactant having a cmc of about 5 mM or greater up to about 50 mM is useful, so long as the surfactant is also itself physiologically tolerable, non-pyrogenic, endotoxin-free and non-denaturing.

On a weight percent basis, rather than millimolar basis, a useful surfactant has a cmc of at least about 0.2 grams per 100 milliliters (g/100 ml) or at least about 0.2 weight percent, and more preferably at least a cmc of about 0.5 weight percent and up to about 2-3 weight percent. (It is to be noted that the weight percentage and millimolar values cannot correlate exactly for all useful surfactants because such surfactants can differ widely in their molecular weights.)

Another way of assessing dialyzability is by use of a standard assay. A useful assay is similar to that utilized herein for endotoxin removal, but is carried out in the absence of the macromolecule and endotoxin sorbant. Thus, the surfactant is dispersed in about 40 ml of phosphate-buffered saline (PBS) at a surfactant concentration of about four-times the cmc of the surfactant, e.g., for OBDG at about 100 mM. That 40 ml of liquid is placed in a Spectrophor dialysis bag with a 12,000–14,000 molecular weight exclusion. The bag and its contents are then placed in a closed 2-liter container filled with PBS as dialyzing fluid, and the container and bag are subjected to constant agitation for a time period of 48 hours at ambient room temperature (20–22 degrees C.), with at least four changes of dialyzing fluid made at about evenly spaced intervals during the 48 hours.

The amount of surfactant remaining in the bag is thereafter determined. If the surfactant remaining in the solution in this assay is not more than about 2 percent of that originally present; i.e., 2 percent of an amount that is four-times the surfactant cmc value, the surfactant can be said to be dialyzable for the purposes of this invention and the aqueous liquid containing that amount of surfactant can be said to be substantially free of surfactant. For example, using OBDG at an initial concentration of 100 mM (2.94 weight percent), an average value of 0.016 weight percent was found after endotoxin removal, or about 0.5 weight percent of the originally present amount.

Using the macromolecule under the same conditions with a known, initial concentration of about 1–10 mg/ml, retention of at least about 95% weight percent of the initially present macromolecule indicates that the macromolecule is non-dialyzable.

It is preferred to use the surfactant at about two to about six times its critical micelle concentration to insure that all the endotoxin-macromolecule complexes are dissociated. However, using concentrations larger than those does not offer any additional benefit. Further, larger concentrations waste surfactant and increase the time required to reduce surfactant concentration to a desired concentration.

A surfactant is an effective emulsifier only at a concentration above its cmc. Therefore, the surfactant used in the method of this invention must be initially present at a concentration greater than its cmc.

Table 1 below illustrates the cmc of several commercially available surfactants expressed in grams per 100 ml of solution and, in some cases, in millimolar (mM) concentrations. Hydrophilic-lipophilic balance (HLB) values are also listed for selected surfactants.

TABLE 1

| Critical Micelle Concentration of Various Surfactants | | | |
|---|---|---|---|
| Surfactant | CMC (g/100 ml)* | CMC (mM)* | HLB[6] |
| Tween 80[1] | 0.0013 | — | 15.0 |
| digitonin[2] | 0.001–0.004 | — | 0.4 |
| Triton N-101[3] | 0.085 | — | 13.4 |
| Triton X-100[3] | 0.015–0.02 | 0.24 | 13.5 |
| Nonidet P-40[2] | — | 0.29 | 13.5 |
| sodium dodecyl sulfate[2] | 0.15–0.23** | 0.52–8.2** | 40.0 |
| sodium deoxycholate[2] | 0.20 | 4–6 | 16.0 |
| CHAPS & CHAPSO[4] | 0.49–0.50 | 8 | — |
| sodium cholate[2] | 0.57 | 15 | 18.0 |
| octyl-beta-D-glucopyranoside[4] | 0.736 | 25 | — |
| octyl-beta-D-thioglucopyranoside[4] | 0.28 | 9 | — |
| Zwittergent 3-10[4] | 1.2 | — | — |
| Zwittergent 3-08[4] | large[5] | — | — |
| Zwittergent 3-06[4] | large[5] | — | — |

[1]Available from ICI Americas, Inc., Wilmington, DE.
[2]Available from Sigma Chemical Company, St. Louis, MO.
[3]Available from Rohm and Haas Company, Inc., Philadelphia, PA.
[4]Available from Calbiochem, La Jolla, CA.
[5]Greater than 1.2.
[6]HLB means Hydrophile-Lipophile Balance. HLB numbers form a system for the selection of emulsifying agents for a particular use. Lipophilic (non-polar) emulsifiers have HLB numbers below 9, whereas hydrophilic (polar) emulsifiers have HLB numbers above 11.
*CMC = critical micelle concentration expressed in grams per 100 milliliters (g/100 ml) and millimolarity (mM).
**values for CMC reported at 0.5 molar NaCl and in water, respectively. Helenius et. al., Biochim. Biophys. Acta, 415:29–79 (1975).

Solutions of SDS are reported to remove LPS from polymixin B affixed to a solid matrix. SDS is a well known protein denaturant and for that reason alone is not useful herein. In addition, SDS was found to dialyze poorly out of a solution under conditions otherwise found useful herein, and it therefore appears that the SDS cmc value is nearer to the 0.015 value shown in Table 1 than it is to the 0.23 weight percent value also shown in that Table under the conditions usually used herein.

The bile acids sodium cholate and sodium deoxycholate could be useful herein based upon their cmc values, but as is the case for other surfactants exhibiting a net electric charge in solution, are not used herein. The bile acids, while generally classified as mild and non-denaturing, have been reported to cause denaturation. In addition, because of their anionic charges at normal use pH values, the anionic bile acids (as well as cationic detergents) can adversely bind to the macromolecule. Still further, as noted previously, Issekutz and Firca et al. disclose use of 1 and 3 percent deoxycholate, respectively, to strip bound endotoxin from affintiy sorbants, thereby providing another reason to avoid use of those surfactants.

Thus, the surfactants useful in the present method also are free of a net electric charge at the pH of dialysis, e.g., pH 6–9. Preferably, the surfactant is also non-ionic.

Octyl-beta-D-glucopyranoside, octyl-beta-D-thio-glucopyranoside, MEGA-8, -9 and -10 (the octanoyl-, nanoyl- and decanoyl-N-methylglucamides, respectively; available from Calbiochem), CHAPS (3-[(3-chlolamidopropyl)dimethylammonio]-1-propanesulfonate), CHAPSO (3-[(3-chlolamidopropyl)dimethylammonio]-2-hydroxy-1-propanesulfonate) and ZWITTERGENT 3-10, 3-08 and 3-06 surfactants (N-decyl- and N-octyl- and N-hexyl-N,N-dimethyl-3-ammonio-1-propanesulfonates, respectively) are useful herein. These surfactants have critical micelle concentrations greater than about 0.2 weight percent or at least about 5 mM, where such information has been reported. The MEGA surfactants are reported in their supplier's literature to be readily removed by dialysis and to be non-denaturing. In the first report of the MEGA surfactants [Hildreth, Biochem. J., 207: 363–366 (1982)], the author stated that cmc values could not be measured, but that the results obtained indicated cmc values similar to that of octyl-glucopyranoside (oxtyl-glucopyranoside).

Each of the above surfactants exhibits no net electric charge at the pH values contemplated herein. However, as noted before, the nonionic surfactants such as octylglucopyranoside are preferred over the zwitterionic surfactants.

A most preferred surfactant is octyl-beta-D glucopyranoside (also referred to as octyl-glucopyranoside or OBDG) (Calbiochem, La Jolla, Calif). The surfactant has a cmc of 0.736 weight percent [25 mM]. Octylglucopyranoside is used at a concentration greater than about 25 mM, and preferably at a concentration of about 50 to about 150 mM. A solution of OBDG can be reduced from a concentration of 100 mM to less than about 0.05 weight percent (about 1.7 mM) by about 48 hours of dialysis in a dialysis bag against surfactant-free buffer.

Dialysis, ultrafiltration (also called reverse osmosis) and diafiltration are separation methods that perform similar functions. Dialysis is a chemical concentration (osmosis)-driven process of selective diffusion of relatively small molecules through a semipermeable membrane to equalize the concentration of the small molecules on each side of the membrane. Ultrafiltration is a hydrostatic pressure-driven membrane process in which molecules are retained or passed through the membrane on the basis of size in a manner otherwise similar to that of dialysis. Diafiltration is also driven by hydrostatic pressure, except that liquid enters the diafiltration chamber in an amount to substantially match that which passes through the membrane. The resulting diafiltered liquid therefore contains about the same concentration of macromolecule before and after the diafiltration is carried out.

Although dialysis, ultrafiltration and diafiltration are different processes, each process operates using a semipermeable membrane that excludes or passes molecules on the basis of molecular size and each produces a similar result under the conditions of this invention. Any of those process can be used to remove useful surfactant monomers from solutions containing macromecules.

The word "dialysis" is used hereinafter to refer to dialysis in its strict sense, as defined before, and also to ultrafiltration and diafiltration.

Membranes for dialysis are available from Spectrum Medical Industries, Inc., Los Angeles, Calif., and its distributors such as Cole-Parmer Instrument Co., Chicago, Ill., under the trademark SPECTRA/POR, and are typically provided as tubing that can be made into bags by closing of both ends. These membranes are made from regenerated cellulose and can be subjected to various treatments prior to use to adjust pore size, and thereby the molecular weight of the retained (excluded) solute molecules. Craig, Chapter 8, "Dialysis and Ultrafiltration" in *Methods in Immunology and Immunochemistry*, Williams and Chase eds., Vol. II, Academic Press, New York (1968), pages 119-133.

Suitable hollow fiber dialysis membranes made from various materials are also available from several commercial sources as well as being described in the patent and scientific literature. For example, polysulfone hollow fibers are available from Amicon, Corp, Lexington, MA, whereas cellulosic fibers are available from Cole-Parmer. U.S. Pat. No. 3,441,142 describes a hollow fiber membrane made from a cellulosic material, a portion of whose hydroxyl groups are converted to oxy alkali metal groups that are thereafter reacted with a haloalkyl dialkylamine followed by quaternization. The quarternary salt is thereafter reacted with an alkali metal salt of an anti-thrombogenic compound such as heparin, which last step is not required herein. Further useful hollow fiber dialysis membranes that are prepared from graft polymers of poly(ethyleneimine) and nylon 6—6 or cellulose acetate are described in U.S. Pat. No. 3,857,782, whereas U.S. Pat. No. 3,457,256 describes cellulosic membranes having carboxy groups that are reacted with amines or carboxylic acids in the presence of a water-soluble carbodiimide.

Useful flat dialysis membranes are also available from Amicon Corp. These filters are typically utilized in stirred ultrafiltration or diafiltration cells, and are available with a wide range of solute exclusion molecular weights. Those filters can be used with a wide variety of aqueous media and over a wide range of dialysis pressures.

Every material has at least some water-solubulity. As a consequence, the term "water-insoluble" is used herein in its usual sense to mean that the matrix and sorbant made therefrom are recovered substantially intact and in substantially the same amount as that admixed with the aqueous medium when the first solid-liquid admixture is prepared. The matrix and sorbant are typically swellable in water, and can form a gel-like solid phase and still be within the purview of a water-insoluble material as contemplated herein.

As noted previously, a number of endotoxin sorbing agents have been reported as useful when linked to a water-insoluble solid phase matrix to form an endotoxin sorbant. A number of water-insoluble matrices and endotoxin sorbing agents useful herein are discussed hereinafter.

For example, Gendrich et al. in U.S. Pat. No. 4,491,660 describe sorbants of the general formula A-x-B-y-Z wherein A is a water-insoluble polymer; x is a first linking group; B is a spacer group; y is a second linking group; and Z is an aryl group unsubstituted or substituted. Each of A, x, B, y and Z can be one of a number of specified groups. Similarly, Chibata et al. in U.S. Pat. No. 4,381,239 describe endotoxin sorbants comprised of a water-insoluble polymer bonded to a substituted nitrogen-containing heterocycle. The use of water-insoluble anion exchange resins as endotoxin sorbants is described by Grabner in U.S. Pat. No. 3,897,309. Each of the endotoxin sorbants described above, and which descriptions are incorporated by reference, is particulate and was used in the particulate form for contacting an endotoxin-containing aqueous solution. Those particulate sorbants are also useful herein.

A particularly preferred endotoxin sorbant contains polymyxin B (PMB or PB) linked to a water-insoluble polymer matrix. As described previously, PMB is a lipophilic antibiotic that complexes with free endotoxin in solution. A brief description of polymyxin antibiotics, including polymyxin B and polymyxin B sulfate, can be found in *The Merck Index* Tenth Edition, 1093 (1983). *The United States Pharmacopeia*, Twentieth Revision, 638 (1980) also describes polymixin B. When affixed to a water-insoluble solid phase matrix, PMB forms an effective insoluble solid phase affinity sorbant for endotoxin.

A preferred particulate solid phase matrix is crosslinked agarose. Particularly preferred is a cross-linked agarose such as cyanogen bromide-activated Sepharose 4B (Pharmacia Fine Chemicals, Piscataway, N.J.) which is readily linked to PMB to form the solid phase sorbant. An exemplary 5 ml volume of polymyxin B-Sepharose 4B (PB-Seph4B) is capable of adsorbing about 12 mg of endotoxin, which is far in excess of the amount of endotoxin present in all but the most contaminated macromolecule solutions. Further, the sorbant can be backwashed with, for example, strong detergents such as a 1 percent SDS solution or a 1-3 percent sodium deoxycholate to restore the ability to bind endotoxin. Thus the sorbant can be reused.

Sepharose 4B is utilized herein as an eeemplary solid phase matrix. However, additional particulate and monolithic solid phase matrices are also useful herein. Exemplary of such matrices are Sepharose 6B, glass beads, and the inner and outer surfaces of hollow fibers as are useful in hemodialysis or ultrafiltration (as are discussed further hereinafter), and the various matrices described in U.S. Pat. Nos. 4,491,660, 4,381,239, and 3,897,309 that are discussed hereinbefore, as well as the amine-reactive polymers described in U.S. Pat. Nos. 3,597,220, 3,597,221, 3,597,351, 3,650,900, and 3,650,901, all of whose disclosures are incorporated by reference.

Typically, any water-insoluble solid phase matrix that reacts with an amino group or a carboxy group is suitable. In addition to matrices specifically mentioned herein, several suitable particulate (beaded) matrices are listed in the 1984 Sigma Chemical Company catalogue at pages 98 to 113.

Methods of affixing PMB to the matrix are also well known by skilled artisans and need not be dealt with in detail herein. Illustratively, however, such methods include use of activated carboxyl groups as are provided by cyanogen bromide treatment of glucose-containing solids and chemical reactions using water-soluble carbodiimide technology, glutaraldehyde linking and the like.

In addition, U.S. Pat. No, 4,357,311 to Schutt discloses a method for preparing an activated microporous substrate to which an antibody can be covalently bonded through trichloro-triazine to yield an activated substrate. That method can also be used to link PMB or another endotoxin sorbing agent rather than an antibody to a microporous substrate. Further, numerous methods for immobilizing enzymes that are applicable for affixing an endotoxin sorbing agent to a support are discussed in *Enzyme Technology*, published by Noyes Data Corporation (1983) at pages 38 to 59.

Several published techniques are useful for linking the endotoxin sorbing agent to a monolithic matrix as for use in the before-described second variant of the embodiment wherein the endotoxin sorbant is monolithic.

For example, Sampson et al., *Trans. Am. Soc. Artif. Int. Organs*, XVII:54-59 (1972) reported linking L-asparaginase to the surfaces of poly(methyl methacrylate) (PMM) plates. The reaction was carried out in three steps: (1) the roughened PMM surface was aminated by reaction with an aqueous solution of gamma-amino propyl triethoxysilane; (2) the amine groups were thereafter activated by reaction with aqueous glutaraldehyde; and (3) followed by reaction with 0.1 mg of asparaginase/ml of 0.15 M phosphate buffer, pH 6.7. Thus, replacement of L-aspariginase with an equimolar amount of an endotoxin sorbing agent such as PMB provides a useful sorbant over which to pass the macromolecule-containing aqueous medium. A similar apparatus is also described by Tapia et al., *Trans. Am. Cos. Antif. Intern. Organs*, XXIII, 443-337 (1977).

Useful endotoxin sorbants can also be prepared from an endotoxin sorbing agent and nylon tubing by a process analogous to that described by Allison et al., *Biochem. Biophys. Res. Comm.*, 47:66-73 (1972) or from dacron as described by Cooney et al., *Biochem. Pharm.* 24:503-515 (1975), in which L-asparaginase is replaced by the endotoxin sorbing agent.

Polymyxin B or another endotoxin sorbing agent can also be linked to a hollow fiber dialyzer by known methods, For example, Jackson et al, *J. Pharmacol. Exp. Ther.*, 209:271-274 (1979) linked an enzyme to the outside surface of a reconstituted cellulose hollow fiber dialysis membrane. The endotoxin sorbing agent is linked herein to the inside surface of the hollow fibers as follows. After rinsing the cellulosic fibers, a solution of 0.15 N NaOH is passed through the fibers to add hydroxyl groups. After rinsing and pH adjustment with bicarbonate and carbonate buffers, a solution of CNBr is passed through the fibers to activate the fibers, and the fibers are thereafter rinsed free of the CNBr. An aqueous solution containing an amine-containing endotoxin-sorbing agent such as PMB is thereafter passed into the activated fibers and permitted to react with the CNBr-activated fiber. After rinsing out the unreacted endotoxin-sorbing agent, any unreacted imidocarbonate groups can be reacted with lysine, glucine, diethanoloamine or the like. After final rinsing, the hollow fibers are ready for use.

The methods for preparing dialysis membranes disclosed in U.S. Pat. Nos. 3,457,256, 3,799,356, and 3,857,782, whose disclosures are incorporated by reference, are also useful. For U.S. Pat. No. 3,799,356, the quaternizing agent preferably contains a carboxylic acid such as 3-chloropropionic acid, and the quaterinization step is followed by a step in which an amine-containing endotoxin sorbant is linked to the polymer matrix. Typically, that linking step is carried out after the fiber is formed and is readily accomplished by use of a water-soluble carbodiimide. The membranes of U.S. Pat. No. 3,857,782 can be made useful herein by first reacting the endotoxin sorbing agent with trichloro-triazine and then reacting that adduct with the amine-containing membrane fibers of the patent following the procedure of Example 2 of U.S. Pat. No. 4,357,311.

The endotoxin-contaminated macromolecule-containing liquid, aqueous admixture is preferably continually contacted with the solid phase sorbant that provides relatively large surface area for binding to endotoxin. The contact is substantially continual whether the sorbant is monolithic or particulate. Freed endotoxin is thereby adsorbed by the affinity sorbant.

Continual contacting is provided with a monolithic sorbant by passing the liquid, aqueous admixture over the sorbant surface. Continual contacting of a particulate sorbant can be achieved in a column by passage of a first aqueous admixture through that column with the sorbant as the solid phase. The particulate sorbant can also be agitated in a vessel such as a beaker that contains the liquid admixture. Typically, such a vessel is kept closed to avoid contamination and evaporation.

The continual contacting can also be provided by agitating a particulate solid phase support in the aqueous medium to provide a suspension of the solid phase sorbant in the liquid phase, as for example, by placing a bag dialysis apparatus on a shaking platform, by using a device that rotates the dialyzing apparatus, by stirring the dialyzing admixture, and the like. In the present studies, a shaking platform was initially used on which was placed a container holding a dialysis bag and its dialyzing solution. To decrease the possibility of mechanical rupture of the bag and of trauma to the protein, the apparatus was changed to a rotational (tumbling)

device in which the solid-liquid phase admixture contents within a dialysis bag were agitated by slowly rotating the bag and the external solution within a closed, elongate vessel whose rotation provided the agitation within the dialysis bag. Thus, gravity was used to help assure that the sorbant remained in suspension so that the contacting was continual.

It is preferred to contact and dialyze the macromolecule-surfactant admixture with the solid phase sorbant in an aqueous medium having an ionic strength of less than about 2 molar (M), more preferably at about 0.01 to about 1.0 M. Of course, the dialysis fluid must have the same ionic strength to maintain the salt concentration throughout the contacting and dialyzing period.

The method of this invention for reducing the endotoxin concentration in macromolecule-containing solutions is an efficient, easy, and reproducible system for decontaminating macromolecules, such as proteins in solution.

As is discussed hereinafter, use of polymyxin B linked to Sepharose 4B as discussed above, without a surfactant, during dialysis failed to adequately reduce the endotoxin concentration in LPS-contaminated protein solutions. This result, which utilized techniques similar to those described by others and discussed hereinbefore, and the results with dialysis suggest that binding of endotoxin to protein may limit the capacity of sorbant systems alone, and even when coupled with simultaneous dialysis, to efficiently clear endotoxins from such solutions. None of the previously described methods for decontaminating protein solutions address the problem of inaccessibility of macromolecule-bound endotoxin to removal by affinity sorbant chromatography methods, regardless of the solid phase sorbant employed.

In terms of effectiveness, the advantage of the method of this invention in comparison to previously published methods is apparent. In addition to causing about a one to ten thousand-fold decrease in Limulus assay reactivity of a bovine catalase preparation, use of the method eliminated pyrogenic responses in rabbits to the treated protein. Moreover, animals given catalase subsequent to its decontamination by the method of this invention were protected from the generalized Schwartzman reaction produced with endotoxin-contaminated, untreated catalase.

The activity of catalase was not significantly affected by the endotoxin reduction method. Other macromolecules examined similarly retain activity and withstand the surfactant treatment, together with prolonged dialysis and motion.

Unlike affinity chromatography methods that do not break the macromolecule-endotoxin complex, this method can be carried out repeatedly with continued reduction of endotoxin concentration. Some loss of protein due to non-specific attachment to the solid phase sorbant was a constant feature of the method, although this loss was decreased using high salt content (about 0.3 to about 0.8 molar, and particularly 0.5 molar) during dialysis. Further, with the aid of a microdialyzer, it was possible to extract endotoxin from volumes as low as 200 microliters (ul) and quantities in the order of 500 micrograms (ug). Although some protein is lost during decontamination, prior to treatment none of the protein was useable for introduction into the blood or body cavity of an animal, whereas after decontamination by the methods of this invention, the purified macromolecules typically were useful.

While not wishing to be bound to a single hypothesis, it is believed that the reagents and manipulations of the present method cooperate to provide the observed results by the following mechanism. The surfactant separates endotoxin that is bound to the macromolecule desired to be purified, and emulsifies, at least in part, both the macromolecule and the endotoxin in its micelles. Dialysis slowly frees the admixture of surfactant molecules and thereby frees the emulsified endotoxin and macromolecule to the aqueous medium.

As a solute in the medium, the endotoxin can recombine with the macromolecule or complex with the endotoxin sorbing agent of the solid phase sorbant. Since the endotoxin ultimately is found complexed to the sorbant, it is thought that te affinity of sorbing agent such as polymixin B for LPS is greater than is the affinity of the LPS for the macromolecule. Continual contacting of the liquid phase of the admixture with the solid sorbant helps to assure that there is a relatively high concentration or availability of the solid phase-affixed sorbing agent to complex the freed endotoxin. Thus, as dialysis continues, more and more LPS is freed from the surfactant micelles, and more and more LPS complexes with the sorbant; thereby decontaminating or purifying the macromolecule.

The results described hereinbelow describe data obtained using particular, exemplary, embodiments of the present invention. It is to be understood that the results are illustrative of the invention, and are not limiting.

B. Assessment Of Endotoxin Reduction

The data of Table 2, below, illustrate that a major decrease in endotoxin reactivity, as measured by Limulus assay described in detail in Section J(7)a was achieved in all macromolecule solutions decontaminated according to the method of this invention. The data of Table 2 show dilutions (Limulus titers) of the macromolecule-containing aqueous phases needed to provide no reactivity in the Limulus assay. The Table 2 data also illustrate an initial relatively low recovery of the desired macromolecule (average of 57 percent) that was improved (average of 68–72 percent) by the use of 0.5 molar (M) sodium chloride in a 0.1M sodium bicarbonate buffer at a pH value of 8.0 for the sample and dialysate. Those data further illustrate that an exemplary method of this invention decreased LAL reactivity of the macromolecule-containing solutions by two to three orders of magnitude, while losing relatively small amounts of the desired macromolecule, here catalase or a monoclonal antibody.

TABLE 2

| | Limulus Titers | | |
|---|---|---|---|
| Solution Macromolecule[1] | Before Treatment | After Treatment | Average Protein Loss (%) |
| Catalase[2] (8)[3] | +>1:100,000 | +1:50 −1:100 | 43(25–54)[4] |
| Catalase[5] (3)[3] | +>1:100,000 | +1:50 −1:100 | 24(20–39)[4] |
| Catalase[6] (8)[3] | +>1:100,000 | +1:20 −1:50 | 28(22–43)[4] |
| OKT4 Ab[6,7] (3)[3] | +1:500 −1:100 | +1:20 −1:50 | 32(21–40)[4] |
| Bact. ext.[8] (1)[3] | +>1:100,000 | +1:50 | 80 |

TABLE 2-continued

| Solution Macromolecule[1] | Limulus Titers | | Average Protein Loss (%) |
|---|---|---|---|
| | Before Treatment | After Treatment | |
| | | −1:100 | |

[1]The macromolecule solutions'concentrations, the source of the macromolecules, and any manipulations performed before the reduction method are described in Section J(1). A greater than sign (>) indicates the presence of endotoxin at greater than the dilution shown. Plus signs (+) indicate the presence of endotoxin at a particular dilution, whereas minus signs (−) indicate the absence of endotoxin at a concentration.
[2]Endotoxin concentration was reduced by an exemplary method of this invention using PMB linked to Sepharose 4B and 100 mM octyl-glucopyranoside surfactant as described in detail in Section J(2).
[3]Number of assays carried out are in parentheses.
[4]Range of assay values in parentheses.
[5]The endotoxin reduction method was as in footnote 1 except that the macromolecule solution and dialysate were adjusted to 0.5 molar (M) NaCl concentration to minimize protein loss.
[6]The endotoxin reduction method was as in footnote 5 except that the macromolecule solution was admixed and maintained with surfactant (OBDG) for 6 hours prior to contacting with PMB-Sepharose 4B to improve separation of endotoxin and the macromolecule of interest.
[7]Monoclonal antibody OKT4 obtained from Ortho Diagnostic Systems, Inc., Raritan, N.J. U.S. Pat. No. 4,381,295 (ATCC CRL 8002).
[8]A bacterial extract from the pili of *Neissenia gonorrhoea* was treated by the endotoxin reduction method as described in footnote 6 except that the solution was maintained at pH value of 9.5 to prevent precipitation.

C. Evaluation Of Endotoxin Reduction

The Limulus amoebocyte lysate (LAL) assay and the U.S.P. rabbit pyrogen test are two commonly used methods to determine the presence of endotoxin in a solution. Both assays are discussed in detail hereinafter. A comparison of the procedures and the results of the methods is found in the *Journal of Laboratory and Clinical Medicine*, 78:138–148 (1971).

The pyrogen test on rabbits described in detail in Section J(7)b was used to evaluate the pyrogen-reducing efficiency of the method for a solution of the macromolecule catalase in comparison to methods omitting surfactant, polymyxin B or linkage of the polymyxin B endotoxin sorbing agent to the Sepharose 4B matrix. One sample of catalase solution purified using a method of this invention as described in detail in Section J(2) was used as a control. Other samples of catalase solution were admixed, contacted and maintained with one of the following reagents during dialysis: polymyxin B-Sepharose 4B/alone; surfactant (100 mM octyl-glucopyranoside) alone; polymyxin B (100 mg) alone; and polymyxin B (100 mg) plus surfactant (100 mM octyl-glucopyranoside). Following treatment, 0.2 milligrams (mg) of each catalase sample were brought up to a volume of 1 milliliter (ml) with pyrogen-free saline, and were injected into rabbits as described in detail in Section J(7)b.

Figure 1:
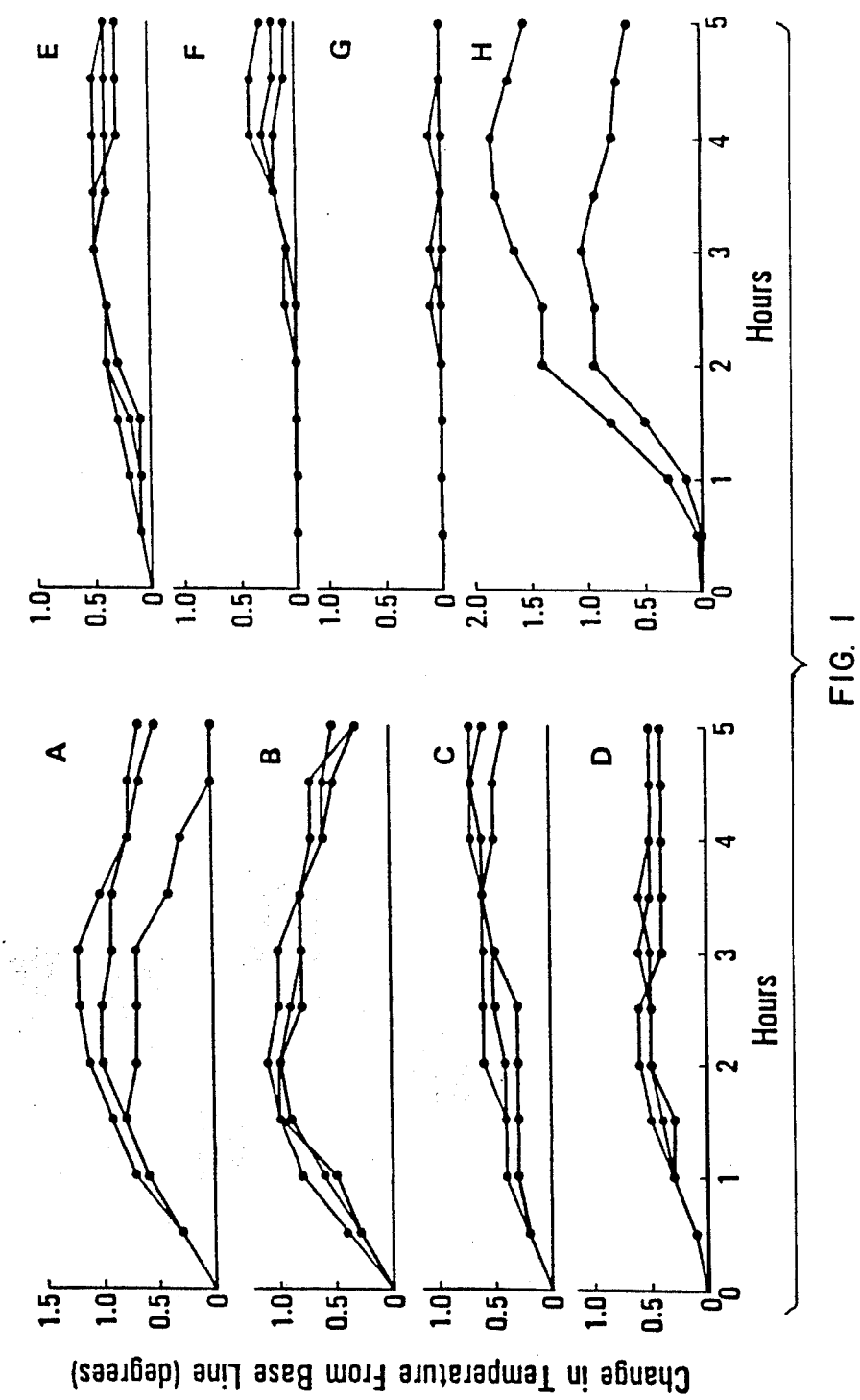
FIG. 1 is a graph containing seven panels (A–H) that illustrate the fever response of rabbits in the U.S.P. pyrogen test described hereinafter. The rabbits were injected with 1 milliliter (ml) of solution containing 0.2 milligrams (mg) of treated or untreated catalase or a 1 ml control solution. All animals were stabilized for two hours prior to injection and had basal temperatures of 37.5°–39.5° C.

FIG. 1 illustrates the results expressed as the degree C change of temperature (T) for each 30 minute time segment for all five treatment groups, with pyrogen-free saline and untreated catalase serving as negative and positive controls, respectively.

As illustrated in FIG. 1, 1 milliliter (ml) of untreated bovine catalase solution (0.2 mg/ml; panel A) was consistently pyrogenic in rabbits, with initial rises in temperature occurring within 30 minutes of injection, reaching a peak at between 3 and 3.5 hours. The maximum increase in basal temperature was between one and two degrees C. (average 1.45 degrees C.). The pattern of temperature rise and maximum level was similar to that displayed by rabbits injected with 1 nanogram (ng) of a known endotoxin standard (Re595 LPS; panel H). Pyrogen-free saline control animals (panel G) showed no significant increase in basal temperature over 6 hours (maximum 0.3 degrees C.). Whereas the other treatments seemed to influence the temperature curve slightly, use of a method of this invention (panel F) provided a catalase solution that fulfilled the criteria of a negative pyrogen test of the U.S. Pharmacopeia; i.e., a rise of temperature over 3 hours of less than 0.6 degrees C. each for three rabbits, with a summation of temperature rises for these three animals being less than 1.4 degrees C.

In a further assay to evaluate the biologic effectiveness of the endotoxin reduction technique, the ability of the treated and untreated catalase to prime for intravascular coagulation of the generalized Shwartzman reaction was evaluated. A 24-hour leukocytosis characteristic of endotoxin administration was observed in rabbits receiving untreated, but not treated, catalase, as can be seen from the data of Table 3.

TABLE 3

Modification of the Shwartzman Reaction Induced By Endotoxin-Contaminated Catalase

| Catalase Priming Fibrin[c] | Endotoxin Challenge (ug) | WBC Counts (mean) 24 hr/mm[c] | Kidney Findings* | |
|---|---|---|---|---|
| | | | Gross[a] | Histology[b] |
| 10 mg | 50 (n = 6) | 13,500 | 2/6 | 2/6 | 2/6 |
| untreated | 250 (n = 5) | 19,300 | 3/5 | 5/5 | 5/5 |
| 10 mg | 50 (n = 7) | 7,000 | 0/6[d] | 0/6 | 0/6 |
| treated | 250 (n = 5) | 9,800 | 0/4[d] | 0/4 | 0/4 |
| Saline | 50 (n = 5) | 7,500 | 0/5 | 0/5 | 0/5 |
| | 250 (n = 7) | 9,400 | 0/6[d] | 0/6 | 0/6 |

[a]Evidence of hemorrhage and bilateral cortical necrosis.
[b]Diffuse or segmental necrosis with glomerular capillary plugs.
[c]Glomerular capillary fibrin plugs.
[d]One rabbit died shortly after endotoxin administration.
*The first numeral indicates the number of animals exhibiting a characteristic, whereas the second numeral indicates the number of animals studied.

Evidence of bilateral cortical necrosis or focal necrosis and glomerular capillary fibrin deposition consistent with intravascular coagulation was found in rabbits primed with untreated catalase and challenged with 250 micrograms (ug) of Re595 LPS. No elements of the Shwartzmann reaction were found in rabbits primed with the catalase preparation treated by a method of this invention. The frequency of the Shwartzman reaction was less when a 50 ug endotoxin challenge was used.

D. Octyl-glucopyranoside Concentrations And Catalase Activity After Decontamination Residual octyl-glucopyranoside was assayed in OKT4 monoclonal antibody solutions after decontamination by a method of this invention, and averaged 0.016 percent by weight (range 0.011%-0.023%). Addition of octyl-glucopyranoside in this concentration range to *Shigella flexneri* endotoxin reference solutions (Sigma Chemical Company, St. Louis, Mo.) having concentrations 0.1 ng/ml, 0.5 ng/ml, and 1 ng/ml of endotoxin did not affect the Limulus assay result.

Activity was assessed in all catalase samples before and after purification treatment. Average post-decontamination function was 89 percent of predecontamination levels (range 75 percent-95 percent).

E. Reduction Of Endotoxin In Protein Solutions

The data of Table 4, below, illustrate that continually contacting an endotoxin-contaminated macromolecule (catalase) solution with PMB-Sepharose 4B along with dialysis during a contacting-dialyzing step is not as effective as is the use of a method of this invention that also includes the dialyzable surfactant during that contacting-dialyzing step. Here, radiolobelled LPS ($^3$H-LPS) was added to solutions of proteinaceous macromolecules (human IgG or catalase), and equal portions of the resulting solutions were admixed with PMB-Sepharose, PMB-Sepharose plus OBDG, or were left without added reagents, and were dialyzed with agitation for a time period of 48 hours. A protein estimation of the aqueous phase was thereafter made, and the number of counts in an aliquot of the aqueous phase was determined so that the relative amounts of protein and LPS present in the aqueous phase could be determined.

Following endotoxin reduction in accordance with this invention, the solid phase PMB-Sepharose 4B sorbant was treated with a 1 percent SDS solution to remove bound LPS. The counts that were removed from a macromolecule-LPS admixture were eluted (97.4 percent) from the sorbant, demonstrating that the balance of the LPS was bound to the sorbant. Results from additional studies showed that the solid phase PMB-Sepharose 4B sorbant that had been freed of bound endotoxin by the SDS treatment could be successfully reused for additional endotoxin removal.

TABLE 4

| | CPM From $^3$H-LPS Dialyzed Macromolecule Preparations | | |
|---|---|---|---|
| Protein | No Added Reagents | PMB-Sepharose | PMB-Sepharose/OBDG |
| Human IgG | 331,357[1] | 39,470[1] | 260[1] |
| | (99.4)[2] | (11.8)[2] | (0.0)[2] |
| Prot. conc. | 53[3] | 23[3] | 25[3] |
| | (100)[4] | (43.4)[4] | (47.2)[4] |
| Catalase | 398,800[1] | 28,544[1] | 1,472[1] |
| | (99.7)[2] | (7.1)[2] | (0.0)[2] |
| Prot. conc. | 1[3] | 0.625[3] | 0.6[3] |
| | (100)[4] | (62.5)[4] | (60.0)[4] |

[1]Counts by beta radiation quantitation in counts per minute (cpm).
[2]Percentage of added counts.
[3]Prot. conc. = protein concentration in milligrams per milliliter (mg/ml) as determined by Lowry assay.
[4]Ratio of recovered protein to initial protein expressed as a percentage.

The data of Table 4 illustrate a decrease in LPS concentration of about three orders of magnitude between the untreated control protein and proteins decontaminated in accordance with this invention. Those data also illustrate a decrease in LPS of one to about two orders of magnitude due to the presence of a dialyzable surfactant in the dialyzing, continually contacted solid-liquid phase admixture, with substantially no difference in the amount of recoverable protein present being observed when the dialyzable surfactant was present or absent. Thus, the data indicate that the presence of dialyzable surfactant during dialysis improves LPS reduction while not influencing the protein recovery.

F. Cesium Chloride Density Gradient Analysis Of Binding Of Endotoxin To Protein In Solution Since the studies outlined above suggested that a pyrogenic amount of endotoxin resists removal from solution by polymyxin B-Sepharose 4B extraction without surfactant, the location of endotoxin in relation to catalase protein present in solution was determined by CsCl density gradient analysis as described in detail hereinafter. The results of that study are illustrated in FIG. 2.

As seen in panel C of that Figure, there is a substantial shift of the endotoxin peak (panel B) in the gradient to the vicinity of the catalase activity peak (panel A). Furthermore, although about 75 percent of the endotoxin was removed by dialysis and contacting with polymyxin B-Sepharose (panel D), the remainder was very closely associated with the catalase peak. In the sample decontaminated in accordance with this invention (panel E), however, no tritium counts were recorded and thus no radiolabelled LPS was present. The density gradient lines superimposed on the graphs confirm that each sample was subjected to the same gradient.

These data confirm that endotoxin that is not removed from protein solutions by polymyxin B-Sepharose treatment is bound to the protein. That binding accounts for endotoxin's resistance to removal, and the successful use of a dialyzable surfactant in improving decontamination efficiency.

G. Endotoxin Reduction Using A Column

In another embodiment, endotoxin concentration was reduced from a catalase solution by chromatography. Here, an aqueous solution of the LPS-contaminated catalase macromolecule was admixed with OBDG and the resulting aqueous admixture was contacted with the previously-discussed polymixin B-Sephanose 4B particulate sorbant by passage through a column containing the sorbant as the solid phase. The eluate from the column (separated liquid phase) was collected and dialyzed to remove the surfactant. The endotoxin content was monitored in the Limulus (LAL) assay. Protein recovery averaged 78 percent. The results are shown in Table 5, below.

TABLE 5

| Endotoxin Reduction Using OBDG and Chromatography[1] | | |
|---|---|---|
| | LAL Reactivity (highest +/− dilution) | |
| Treatment | Before Ch.[2] | After Ch.[2] |
| Catalase + OBDG over sorbant | +1:100,000 | −1:100 (n = 3) |
| Catalase alone over sorbant | +1:100,000 | −1:10,000 (n = 3) |
| Catalase + OBDG not exposed to sorbant[3] | +1:100,000 | −1:1000 (n = 1) |
| | +1:100,000 | −1:10,000 (n = 1) |
| | +1:10,000 | −1:1000 (n = 1) |

[1]All samples dialysed against 50 mM Tris (pH 9.5) before assay, with data reported at dilutions as discussed in Table 2.
[2]Before Ch. = before chromatography; After Ch. = after chromatography and dialysis.
[3]Three different samples of catalase were used.

As is seen from the data of Table 5, admixture with OBDG followed by chromatography on PB-Seph 4B and dialysis of the eluate to remove OBDG produced a reduction in LAL reactivity (1000-fold) similar to that achieved with the method in which the aqueous, contaminated macromolecule-containing liquid admixture was dialyzed in the presence of the particulate sorbant.

The chromatography approach used a higher ratio of PB-Seph 4B to catalase than the dialysis method. When the ratio was reduced by decreasing the amount of sorbant placed in the column, the amount of LAL reactivity removed decreased below a volume of 0.4 ml of sorbant; i.e., 0.2 ml in the same diameter column, decreased the LAL reactivity by only 100-fold. It is thought that the observed decrease in endotoxin removal was due to a relatively shorter contacting time between the sorbant and aqueous admixture.

Catalase passed over the column without prior exposure to OBDG had only a 10-fold reduction in LAL reactivity. OBDG admixture with the catalase, but without exposure to the solid phase sorbant, followed by dialysis resulted in 10- to 100-fold reductions in LAL reactivity when different batches of catalase were studied.

H. Effects of OBDG on Re595 LPS.

Admixture of Re595 LPS with OBDG appeared to reduce somewhat the in vivo pyrogenic response normally elicited by the LPS (FIG. 1, panel E). One explanation for this is that OBDG alters the structure of this LPS preparation and facilitates the binding of the LPS to HDL present in the blood. It has previously been shown by Ulevitch and his co-workers that LPS-HDL complexes are markedly reduced in their abiliy to induce a pyrogenic response [Ulevitch et al., *J. Clin. Invest.*, 62:1313-1324 (1978)].

In the case of Re595 LPS, the binding to HDL in serum is controlled in part by the content of divalent cations in serum, and the presence of EDTA increases the amount of Re595 LPS-HDL complexes formed in vitro. In separate studies, reduction of the particle size of the LPS was found to be accomplished with detergents. Shands et al., *J. Biol. Chem.*, 255:1221-1226 (1980).

It was therefore sought to be determined if pretreatment of Re595 LPS with OBDG facilitated LPS binding to HDL in normal rabbit (NRS). The results of this study are summarized in FIG. 3, where it is shown that exposure of Re595 LPS to OBDG alters the structure of Re595 LPS in a way that promotes binding to HDL in normal rabbit serum in the absence of added EDTA.

I. Decontamination With Additional Dialyzable Detergents

Further dialyzable detergents were studied and compared to OBDG in a method of this invention using 43 mg/ml of catalase as the macromolecule and the tumbling (rotational) dialysis procedure discussed herein as the means for contacting the solid phase sorbant with the macromolecule-containing aqueous admixture. The results of that study using the LAL assay are shown in Table 6, below.

TABLE 6

| Endoxotin Reduction with Various Surfactants[1] | | | | | | |
|---|---|---|---|---|---|---|
| Admixed | LAL Assay Dilution | | | | | |
| Surfactant[2] | $10^{-2}$ | $10^{-3}$ | $10^{-4}$ | $10^{-5}$ | $10^{-6}$ | $10^{-7}$ |
| No treatment[3] | | | + | + | +/− | − |
| 1 | + | + | − | | | |
| 2 | + | − | − | | | |
| 3 | + | + | + | − | | |
| 4 | + | + | − | | | |
| sorbant[4] only | | | + | + | − | − |

[1]Samples were prepared containing the sorbant and particular surfactants as noted below, and were dialyzed by the tumbling technique discussed in the Materials and Methods Section. After dialysis, samples were assayed in the standard LAL assay using the dilutions shown. A plus sign (+) indicates that the sample at that dilution assayed positively for the presence of endotoxin, whereas a negative sign (−) indicates that the sample at that dilution was endotoxin-free in the assay.
[2]Surfactants used were: 1 = octyl-beta-D-glucopyranocide of 100 mM; 2 = octyl-beta-D-thioglucopyranoside at 40 mM; 3 = Zittergent 3-08 [N—octyl-N,N—dimethyl-3-amino-1-propanesulfonate] at 2 percent by weight; and 4 '2 Zittergent 3-10 [N—decyl-N,N—dimethyl-3-amino-1-propanesulfonate] at 2 percent by weight.
[3]Catalase solution assayed without treatment.
[4]Sorbant used without a detergent.

As can be seen from the data in the above Table, improvements of up to about 10,000-fold were obtained using a method of this invention that included one of dialyzable surfactants discussed before. Each of those surfactants was used at a concentration above its critical micelle concentration. Each of those improvements also displayed a post dialysis endotoxin level that was at least one-tenth that displayed by a similarly treated composition that contained no surfactant.

J. Materials And Methods

1. Solutions Of Macromolecules

A preparation of bovine liver catalase (molecular weight 248,000 daltons) twice crystallized and suspended in water containing one percent (1%) thymol, (Sigma Chemical Co., St. Louis, Mo.) was used. The solution, at a concentration of 43 mg/ml, was dialyzed for 48 hours against 0.01M phosphate-buffered saline (PBS) pH 7.4, at 4 degrees C. to remove thymol present in the preparation as a bacteriostatic agent.

Following endotoxin reduction treatment by the method of this invention and lyophilization, the purified catalase preparation was reconstituted to form a 1 mg/ml solution for use in further studies described herein.

OKT4, a monoclonal antibody (IgG2b; molecular weight about 150,000 daltons) against a lymphocyte determinant was provided by Ortho Diagnostic Systems, Inc., Raritan, N.J., in a pH 7.4 buffered saline solution at a concentration of 1 mg/ml.

A proteinaceous cell wall extract (pili) from the bacterium *Neisseria gonorrhoeae* as provided by Dr. Magdalene So of the Scripps Clinic and Research Foundation, La Jolla, Calif. The extract was suspended in a 0.05M Tris buffer pH 9.5 at a concentration of 0.45 mg/ml.

Sterile lyophilized human IgG (Hyland, S.A. Travenol Laboratories N.V., Lessines, Belgium) was reconstituted to form a 50 mg/ml solution and treated by the method of this invention.

2. Endotoxin Reduction Method

Polymyxin B was linked to Sepharose 4B to form a water-insoluble particulate endotoxin sorbant as described in detail hereinafter in Section 6. The surfactant, octyl-glucopyranoside (OBDG), was admixed with the catalase solution at a concentration of 43 mg/ml at a final concentration of 100 mM octyl-glucopyranoside to form an aqueous liquid admixture. This solution was maintained (incubated) at room temperature for a time period of 30 minutes. One volume of Sepharose 4B-polymyxin B sorbant was admixed with four volumes of the catalase-OBDG admixture to form a solid-liquid phase admixture.

The solid-liquid phase admixture was immediately transferred to a Spectrophor dialysis bag (Spectrum Medical Industries Inc., Los Angeles, Calif.) with a 12,000-14,000 molecular weight exclusion. The bag was then placed in a closed 2-liter container filled with PBS as dialysis fluid. The entire unit was subjected to vigorous agitation to keep the Sepharose in suspension and contact with the aqueous admixture within the dialysis bag. The continual contacting and simultaneous dialyzing was continued for a time period of 48 hours with at least four changes of dialysis fluid until the surfactant had been substantally dialyzed from the first solid-liquid phase admixure to form a second solid-liquid phase admixture that was substantially free of surfactant.

At the end of the dialysis period, the bag was opened and the second solid-liquid phase admixture was transferred into a sterile 50 ml centrifuge plastic tube using a sterile pipette. The solution was then centrifuged at 1500 rpm for 10 minutes to sediment the solid phase sorbant and thereby separate the liquid and solid phases. The liquid phase (supernatant) was transferred to a separate tube, and assayed for protein content and Limulus reactivity as described in Sections J(4) and J(7)a, respectively.

The supernatant was additionally assayed for catalase enzyme activity, and was compared to the activity of an untreated sample having the same protein concentration. An octyl-glucopyranoside assay was also performed. After removing aliquots for assay, the solution was dialyzed for a further 48 hours at 4 degrees C. against distilled water to remove salt. The resulting, virtually salt-free compound was then lyophilized in glassware previously treated with a reagent designed to remove endotoxins from glass surfaces (E-Toxa-Clean; Sigma), and was stored at 4 degrees C. until ready for use. When treated catalase was re-dissolved, another Limulus test was performed on the resulting solution.

It must be exphasized and should be understood by those skilled in the art that all glassware and reagents used in an endotoxin decontamination method must themselves be endotoxin-free, should be sterile, and manipulations should be performed under conditions designed to prevent bacterial endotoxin recontamination.

3. Modifications To Endotoxin Reduction Method

Several modifications of the above method influenced the yield of protein and reduced pyrogenicity of the catalase sample.

The salt content of the protein solution and dialysate were increased to decrease the loss of protein from non-specific adsorption to the Sepharose-containing sorbant. Sodium chloride was admixed with the protein solution to provide a final concentration of 0.5M. Sodium bicarbonate was also added to a final concentration of 0.1M to buffer the solution at a pH value of 8.0. The dialysate was adjusted accordingly to maintain these concentrations throughout the dialysis period.

The surfactant was maintained with the sample for an increased time period prior to admixing with the sorbant to maximize the dissociation of endotoxin and protein. A six-hour maintenance time prior to contact and dialysis was found to increase the efficiency of endotoxin reduction by a factor of two in comparison to solutions contacted with sorbant 30 minutes after the addition of octyl-glucopyranoside.

Because of the small volume of the samples used in the tritiated LPS-bovine catalase studies described in Sections 4 and 5 (hereinafter), a further modification was made to the method. Instead of a dialysis bag, a microdialyzer (BRL, Gaithersberg, Md.) that employed a one-pass dialysate flow system was used. The entire apparatus was placed in a container affixed to a shaking water bath, and was vigorously agitated for the 48 hour time period during which dialysis took place. Once dialysis was completed, 20 microliter (ul) aliquots were taken for determination of $^3$H-LPS by beta radiation quantitation and determination of protein content by Lowry assay.

The vigorous agitation method was also replaced by a more gentle rotational device that utilized gravity to keep the sorbant particles in suspension during the treatment period when studies were done using larger sample volumes. While there is no indication that this modification had any effect on endotoxin reduction, it subjected the protein to less trauma during the course of the treatment and may have improved the amount of activity in the treated sample.

4. Reduction Of Added Endotoxin From Protein In Solution

Biosynthetically tritium-labelled lipopolysaccharide ($^3$H-LPS) from *S. minnesota* (Re595) (Scripps Clinic and Research Foundation, La Jolla, Calif.) was prepared by incorporation of $^3$H-acetate into the growth medium of *Salmonella minnesota* Re595, and the LPS was thereafter isolated and characterized as previously described by Tobias et al., *J. Immunol.*, 128:1420–1427 (1982).

50 Microliters of $^3$H-LPS solution containing 225 micrograms (ug) $^3$H-LPS and $1 \times 10^6$ cpm $^3$H were admixed with 4 ml of human IgG solution (50 mg/ml) to form an admixture. This admixture was maintained (incubated) on a rotating tube holder for 6 hours at room temperature. The admixture was divided into three aliquots of equal volume.

A 20 ul aliquot of $^3$H-LPS solution containing 90 ug $^3$H-LPS and $4 \times 10^5$ cpm $^3$H was admixed with each of three 300 ul aliquots of a 1 mg/ml reconstituted, catalase preparation that had previously been decontaminated by a method of this invention. Each aliquot was maintained in a rotating tube holder for a time period of six hours at room temperature as described above.

One-third aliquots of each of the IgG and catalase $^3$H-LPS admixtures were separately admixed with (1) polymyxin B linked-Sepharose 4B and octyl-glucopyranoside, (2) polymyxin B-Sepharose 4B alone, or (3) no added reagent. Each aliquot admixture so prepared was then dialyzed for 48 hours with agitation.

At the end of dialysis, a protein estimation was made using the method of Lowry, *J. Biol. Chem.*, 193:265–275 (1951). A 200 ul aliquot of each sample was counted for one minute in a beta counter after the addition of 3 ml of liquid scintillation cocktail. The results are illustrated in Table 4 hereinbefore.

The solid phase sorbant sediment from a sample preparation purified in accordance with this invention was suspended in 0.1M sodium bicarbonate buffer, pH 8.0, that contained 0.5M sodium chloride to form a solid-liquid phase admixture that was maintained (incubated) at room temperature overnight on a rotating tube holder. On the next day, the admixture was centrifuged at 1500 rpm for 10 minutes to separate the liquid and solid phases. The liquid phase was assayed for protein content and for beta radiation.

The sorbant-containing solid phase was then admixed with a 1 percent SDS solution to form a second solid-liquid phase admixture that was maintained (incubated) at room temperature overnight. Following separation of the liquid and solid phases by centrifugation, the liquid phase was again assayed for beta-counts. Elution of the counts from the sorbant by SDS treatment demonstrated that the balance of the LPS had been bound to the polymyxin B-Sepharose matrix.

5. Cesium Chloride Density Analysis Of Binding Of Endotoxin To Protein In Solution A density gradient analysis was performed to assess binding of endotoxin introduced into a protein solution, and to demonstrate that use of polymyxin B-Sepharose 4B and octyl-glucopyranoside differed from use of the polymyxin B-Sepharose 4B sorbant alone in their abilities to reduce endotoxin from the protein during dialysis with agitation. The protein studied was bovine catalase that had previously been treated to reduce endotoxin contamination by the method of this invention.

Briefly, 20 ul of $^3$H-LPS were admixed with 300 ul aliquots of a 10 mg/ml solution of catalase to form admixtures. The admixtures were maintained (incubated) for a time period of 6 hours at room temperature. Samples were thereafter admixed with either (1) polymyxin B-Sepharose 4B plus octyl-glucopyranoside, (2) polymyxin B-Sepharose 4B alone, or (3) no added reagent, followed by dialysis of the resulting admixtures, as described before.

Analytic grade cesium chloride (Chemetall GmbH, Frankfurt am Main, FRG) was dissolved in 0.1M Tris buffer, pH 8.0, to a final concentration of 42 g/100 ml. A 5 ml aliquot of CsCl solution and a 320 ul aliquot of a sample were added to each of six Beckman ultracentrifuge tubes. The tubes were spun at 40,000 rpm for 72 hours in an SW50.1 rotor in a Beckman Model L ultracentrifuge at 4 degrees C. Eighteen fractions were collected from each centrifuge tube using a centrally inserted capillary tube that was attached to a Gilson FC-100 fraction collector. The refractive index of an aliquot from each of the fractions was determined using a refractometer (Carl Zeiss). The corresponding density for each aliquot was also calculated. The positions of catalase and of LPS in each gradient function were determined by an in vitro assay of catalase activity as described in Section 9 and by beta radiation quantitation, respectively.

6. Linkage Of Polymyxin B To Sepharose Matrix

The exemplary solid phase sorbant utilized herein contained Sepharose 4B as a matrix that was linked to polymixin B. Linkage of the matrix to polymyxin B was accomplished by cyanogen bromide activation of the matrix followed by additional polymyxin B to the activated bonds so formed. The method followed was similar to that of Issekutz, J. Immunol. Methods, 61:275–281 (1983) for the preparation of a five ml affinity purification column.

Briefly, 1.6 grams of cyanogen bromide-activated Sepharose 4B (Sigma Chemical Co., St. Louis, Mo.) were swollen and washed, and thereafter admixed with 50 milligrams of polymyxin B sulfate (Sigma) in accordance with the directions provided by the supplier (Sigma).

Unreacted sites activated by cyanogen bromide were blocked using aqueous solution of 0.2M glycine.

Following linking and blocking, the polymyxin B-Sepharose 4B was washed at room temperature using three alternating admixtures with 0.1M sodium acetate, pH 4.0, and 0.1M sodium borate, pH 8.0. The polymyxin B-Sepharose 4B sorbant matrix was always used on the day of its preparation.

7. Evaluation Of Endotoxin Contamination a. Limulus (LAL) Assay E-Toxate (Sigma Chemical Co., St. Louis, Mo.) was used in all assays according to the protocol in Sigma Technical Bulletin No. 210. Briefly, 100 microliters (ul) of a sample were admixed with 100 ul of reconstituted E-Toxate powder to form an admixture. An endotoxin reference solution (Shigella flexneri; Sigma) was used as a positive control and pyrogen-free water or pyrogen-free normal saline (Travenol Laboratories, Inc., Deerfield, Ill.) was used as the negative control. These admixtures were maintained undisturbed in a water bath at a temperature of 37 degrees C. for 1 hour.

A positive result (the presence of endotoxin) was achieved when a firm gel formed that could be totally inverted with no loss of integrity. Gels that did not retain their integrity on inversion were considered negative results; i.e., endotoxin was absent. The sensitivity of the test was consistently between 0.1 and 0.5 nanograms per milliliter (ng/ml) of endotoxin. Serial dilutions were made of all samples tested.

Results were expressed as positive or negative at various dilutions. For example, in some instances, a dilution of 1:50 was the highest dilution studied that provided a positive result in the Limulus assay, whereas a dilution of 1:100 was the lowest dilution at which the gel lost its integrity and provided a negative result. Such results are expressed in Table 2 as +1:50 and −1:100. Where only a single +1:100,000 dilution is shown, a greater dilution was required to provide a negative, endotoxin-free, result.

b. Pyrogen Testing In Rabbits

Male New Zealand white rabbits weighing between 2–3 kilograms (kg) were immobilized on boards, and thermometers were inserted six inches into their rectums. The temperature measured for each animal was read by means of a portable transducer attached to the thermometers. Rabbits were left undisturbed for two hours while their core body temperature dropped and stabilized to between 38 degrees and 38.5 degrees. 100 Microliters of sample solutions were added to 0.9 ml of pyrogen-free saline, and the 1 ml final volume was injected into a marginal ear vein of each animal. Temperatures were monitored thereafter every 30 minutes for 5 hours. One microgram of a known endotoxin (Salmonella minnesota, Re595; Scripps Clinic and Research Foundation, La Jolla, Calif.) dissolved in 1 ml of pyrogen-free saline was used as a positive control, and 1 ml of pyrogen-free saline served as a negative control.

8. Assay For Octyl-glucopyranoside

The assay method of Spiro, Analysis of Sugars Found in Glycoproteins, in Methods in Enzymology, eds. Colowick and Kaplan, VIII, 3, Academic Press Inc. (1966) was adapted for use with microtiter plates. This assay is based on quantititation of neutral sugars (hexoses).

In this assay, neutral sugars are converted to furfural derivatives. Thus, following breakdown of glycoproteins by treatment with concentrated sulfuric acid and boiling, furfural derivatives so prepared are reacted with anthrone, and the reaction product is colorimetrically analyzed. Octylglucopyranoside standards were prepared at concentrations of 0.01 percent, 0.05 percent and 0.1 percent (w/v). Distilled water was used as a negative control.

To make the anthrone solution, 720 ml of concentrated sulfuric acid were admixed with 280 ml of distilled water to form an admixture. 500 Milligrams of anthrone and 10 g of thiourea were added to the above admixture, and the resulting admixture was cooled to a temperature of 4° C. to form the anthrone solution utilized.

100 Microliter aliquots of each sample were admixed with 500 ul of the anthrone solution in pyrex tubes to form admixtures. Each admixture was heated in a dry tube heater at 100 degrees C. for 15 minutes. The admixtures were then cooled to 37 degrees C., and after 20 minutes, three 50 ul aliquots of each admixture were pipetted into a well of a microtiter plate.

Absorbance values were read at 620 nanometers (nm). The standards were plotted on a curve. The absorbance values of the standards were used to establish the concentration of surfactant in each sample. The proteins in the solutions to be assayed were also subjected to the octyl-glucopyranoside assay procedure to rule out a false reading based on protein reactivity in the assay system.

9. Assay For Catalase

The technique of Beers et al., *J. Biol. Chem.*, 195:133-140 (1952) was used to quantitate catalase. The assay is based on the enzyme's ability to break down a known, added quantity of hydrogen peroxide. Briefly, a 10 ul aliquot of a sample to be assayed was admixed with 2 ml of 0.05M phosphate buffer (pH 7.0) to form a first admixture. One ml of hydrogen peroxide solution in the same buffer was admixed with the first admixture to form a second admixture such that the final concentration of hydrogen peroxide in the second admixture was 15 mM.

The breakdown of hydrogen peroxide was followed spectrophotometrically at 240 nm. Absorbance value readings were taken at 15 second intervals. The velocity constant of the enzyme was calculated from the initial rate of fall in absorbance values. Comparison of calculated velocity constants and protein concentrations before and after purification provided an assay for the stability of the enzyme to this method of purification.

Catalase activity was expressed in Bergmeyer units using the following equation:

$$1 \text{ unit} = \frac{k}{6.93 \times 10^{-3}} \text{ where } k = \frac{2.3}{dt} \times \log\left(\frac{E_o}{E_l}\right)$$

and dt is 20 seconds, and $E_o$ and $E_l$ are the adsorbence values measured at 240 nm at times zero and 20 seconds.

10. Values Of Initial Endotoxin Contamination Of Exemplary Solutions By Limulus Assay All batches of E-Toxate had similar sensitivity in detecting endotoxin. All solutions were assayed at least six times. A firm gel that withstood complete inversion in the tube was taken as a positive reaction, as described in the Sigma Technical Bulletin and previously herein. The results of the Limulus assay using distilled water and also four proteinaceous macromolecules prior to their LPS decontaminations are shown in Table 7, below, for dilutions at which positive and negative assays were obtained.

TABLE 7

| Limulus Assay Results | | |
|---|---|---|
| Substance Assayed | Sample Dilutions | |
| (initial concentration) | Positive | Negative |
| Pyrogen-free water[1] | not observed | 1:1 |
| Endo. st. (0.1 ng/ml)[2] | 1:1 | 1:2 |
| Catalase (43 mg/ml)[3] | 1:100,000 | not recorded |
| OKT4 (1 mg/ml)[4] | 1:500 | 1:1,000 |
| Bact. ext. (0.4 mg/ml)[5] | 1:100,000 | 1:1,000,000 |
| Distilled water | 1:10-1:100 | 1:1,000 |

[1] Available from Travenol Laboratories, Inc., Deerfield, Illinois
[2] Endotoxin reference solution (*Shigella flexneri*) from Sigma Chemical Company, St. Louis, MO.
[3] Available from Sigma Chemical Company and dialyzed as described in Section 1 to remove thymol.
[4] Available from Ortho Pharmaceutical Corporation, Raritan, NJ.
[5] Bacterial cell wall extract (pili) from *Neisseria gonorrhoeae* in 0.5 M Tris buffer pH 9.5.

The foregoing is intended as illustrative of the present invention but is not limiting. Numerous variations and modifications can be effected without departing from the spirit and scope of the novel concepts of the invention. It is to be understood that no limitation with respect to the specific compositions and uses described herein is intended or should be inferred.

What is claimed is:

1. A method of reducing a bacterial endotoxin contaminant in an aqueous composition containing a biologically useful macromolecule comprising the steps of:
   (a) admixing an endotoxin-contaminated biologically useful macromolecule with a dialyzable surfactant in an aqueous medium to form an aqueous admixture, said surfactant exhibiting no net electric charge at the pH value of said aqueous admixture and being present in said admixture at a concentration greater than said surfactant's critical micelle concentration;
   (b) contacting said aqueous admixture with a water-insoluble solid phase endotoxin sorbant comprising a solid phase matrix linked to an endotoxin sorbing agent to form a solid-liquid phase admixture;
   (c) maintaining said contact for a time period sufficient for said endotoxin to bind to said sorbant and form a second solid-liquid phase admixture whose liquid phase contains water, said macromolecule and a reduced weight ratio of endotoxin to macromolecule as compared to the weight ratio present in said aqueous admixture;
   (d) separating the solid and liquid phases of said second solid-liquid phase admixture;
   (e) dialyzing said surfactant from said liquid phase at a time no earlier than step (c) to provide a liquid phase that contains said macromolecule and is substantially free of surfactant; and
   (f) thereafter recovering the liquid phase that is substantially free from surfactant.

2. The method according to claim 1 wherein said dialysis step is carried out after step (d).

3. The method according to claim 2 wherein said contacting, maintaining and separating of steps (b), (c) and (d) are carried out in a column.

4. The method according to claim 1 wherein said dialysis step is carried out during said maintenance step (c).

5. The method according to claim 1 wherein said endotoxin sorbing agent is polymixin B.

6. The method according to claim 1 wherein said water-insoluble matrix is particulate.

7. The method according to claim 1 wherein said surfactant has a critical micelle concentration of at least about 0.2 weight percent or at least about 5 millimolar.

8. The method according to claim 1 wherein said surfactant is selected from the group consisting of 3-[(3-cholamidopropyl)-dimethylammonio]-1-propanesulfonate, 3-[(3-cholamidopropyl)dimethylamminio]-2-hydroxy-1-propanesulfonate; N-octyl-N,N-dimethyl-3-ammonio-1-propanesulfonate, N-decyl-N,N-dimethyl-3-ammonio-1-propanesulfonate, octyl-beta-D-glucopyranoside, octyl-beta-D-thioglucopyranoside, octanoyl-N-methylglucamide, nonoyl-N-methylglucamide and decanoyl-N-methylglucamide.

9. The method according to claim 1 wherein said surfactant is nonionic.

10. The method according to claim 9 wherein said surfactant is selected from the group consisting of octyl-beta-D-glucopyranoside, octyl-beta-D-thioglucopyranoside, octanoyl-N-methylglucamide, nonoyl-N-methylglucaimide and decanoyl-N-methylglucamide.

11. A method of reducing a bacterial endotoxin contaminant in an aqueous composition containing a biologically useful macromolecule comprising the steps of:
(a) admixing an endotoxin-contaminated biologically useful macromolecule with a surfactant in an aqueous medium to form an aqueous admixture, said surfactant exhibiting no net electric charge at the pH value of said admixture and being present in said admixture at a concentration greater than said surfactant's critical micelle concentration;
(b) contacting said aqueous admixture with a water-insoluble solid phase endotoxin sorbant comprising a solid phase matrix linked to an endotoxin sorbing agent to form a solid-liquid phase admixture;
(c) maintaining said contact for a time period sufficient for said endotoxin to bind to said sorbant and form a second solid-liquid phase admixture whose liquid phase contains water, said surfactant, said macromolecule and a reduced weight ratio of endotoxin to macromolecule as compared to the weight ratio present in said aqueous admixture;
(d) separating the solid and liquid phases of said second solid-liquid admixture;
(e) dialyzing the surfactant out of said separated liquid phase to provide a liquid phase that is substantially free of surfactant; and
(f) recovering said substantially surfactant-free liquid phase.

12. The method according to claim 11 wherein said solid phase sorbant is particulate.

13. The method of claim 12 wherein said contact is substantially continual and is maintained by agitation of said particulate sorbant.

14. The method according to claim 11 wherein said surfactant has a critical micelle concentration of at least about 0.2 weight percent or at least about 5 millimolar.

15. The method according to claim 11 wherein said surfactant is nonionic.

16. The method according to claim 15 wherein said surfactant is selected from the group consisting of octyl-beta-D-glucopyranoside, octyl-beta-D-thioglucopyranoside, octanoyl-N-methylglucamide, nonoyl-N-methylglucaimide and decanoyl-N-methylglucamide.

17. The method according to claim 11 wherein said macromolecule is present in said aqueous admixture at a concentration of about 200 micrograms per milliliter to about 100 milligrams per milliliter.

18. The method according to claim 11 wherein said aqueous medium has an ionic strength less than about 2 molar.

19. A method of reducing a bacterial endotoxin contaminant in an aqueous composition containing a biologically useful macromolecule comprising the steps of:
(a) admixing an endotoxin-contaminated biologically useful macromolecule with a surfactant in an aqueous medium to form an aqueous admixture, said surfactant exhibiting no net electric charge at the pH value of said admixture and being present in said admixture at a concentration greater than said surfactant's critical micelle concentration;
(b) contacting said aqueous admixture with a water-insoluble solid phase endotoxin sorbant comprising a solid phase matrix linked to an endotoxin sorbing agent to form a solid-liquid phase admixture;
(c) maintaining said contact while dialyzing said solid-liquid phase admixture for a time period sufficient for said endotoxin to bind to said sorbant and form a second solid-liquid phase admixture whose liquid phase contains water, said macromolecule, a reduced weight ratio of endotoxin to macromolecule as compared to the weight ratio present in said aqueous admixture, and is substantially free of said surfactant;
(d) separating the solid and liquid phases of said second solid-liquid admixture; and
(e) recovering said separated liquid phase.

20. The method according to claim 19 wherein said solid phase sorbant is particulate.

21. The method of claim 19 wherein said contact is substantially continual and is maintained by agitation of said particulate sorbant.

22. The method according to claim 19 wherein said surfactant has a critical micelle concentration of at least about 0.2 weight percent or at least about 5 millimolar.

23. The method according to claim 19 wherein said surfactant is nonionic.

24. The method according to claim 19 wherein said surfactant is selected from the group consisting of octyl-beta-D-glucopyranoside, octyl-beta-D-thioglucopyranoside, octanoyl-N-methylglucamide, nonoyl-N-methylglucaimide and decanoyl-N-methylglucamide.

25. The method according to claim 19 wherein said macromolecule is present in said aqueous admixture at a concentration of about 200 micrograms per milliliter to about 100 milligrams per milliliter.

26. The method according to claim 19 wherein said aqueous medium has an ionic strength less than about 2 molar.

27. The method according to claim 19 wherein said sorbant is monolithic, is comprised of a dialysis membrane having said endotoxin sorbing agent linked to the surface contacted by said liquid phase, and said contact is provided by flow of the liquid phase across said sorbing agent-containing surface.

* * * * *